(12) United States Patent
Sasaki et al.

(10) Patent No.: US 10,647,881 B2
(45) Date of Patent: May 12, 2020

(54) POLYIMIDE PRECURSOR COMPOSITION, METHOD OF PREPARING POLYIMIDE PRECURSOR COMPOSITION, AND METHOD OF PREPARING POLYIMIDE MOLDED ARTICLE

(71) Applicant: FUJI XEROX CO., LTD., Tokyo (JP)

(72) Inventors: Tomoya Sasaki, Kanagawa (JP); Tsuyoshi Miyamoto, Kanagawa (JP); Kana Miyazaki, Kanagawa (JP); Katsumi Nukada, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 385 days.

(21) Appl. No.: 15/051,115

(22) Filed: Feb. 23, 2016

(65) Prior Publication Data
US 2017/0088746 A1    Mar. 30, 2017

(30) Foreign Application Priority Data
Sep. 24, 2015   (JP) ................. 2015-187422

(51) Int. Cl.
| C09D 179/08 | (2006.01) |
| B29C 41/00 | (2006.01) |
| B29C 41/46 | (2006.01) |
| B29K 79/00 | (2006.01) |
| B29K 105/00 | (2006.01) |

(52) U.S. Cl.
CPC .......... C09D 179/08 (2013.01); *B29C 41/003* (2013.01); *B29C 41/46* (2013.01); *B29K 2079/08* (2013.01); *B29K 2105/0058* (2013.01)

(58) Field of Classification Search
CPC .............................. B29C 41/003; B29C 41/46
See application file for complete search history.

(56) References Cited

U.S. PATENT DOCUMENTS

| 4,014,834 | A | 3/1977 | Concannon | |
| 4,104,221 | A * | 8/1978 | Janssen | .................. C08G 73/16 428/379 |
| 4,238,528 | A | 12/1980 | Angelo et al. | |
| 5,719,253 | A | 2/1998 | Echigo et al. | |
| 2001/0006767 | A1 * | 7/2001 | Kawamonzen | .......... G03F 7/022 430/330 |
| 2012/0241005 | A1 * | 9/2012 | Yamaguchi | ............. B29C 41/24 136/264 |
| 2013/0171520 | A1 | 7/2013 | Nakayama et al. | |
| 2014/0213724 | A1 | 7/2014 | Miyamoto et al. | |
| 2014/0378584 | A1 | 12/2014 | Reynolds | |
| 2015/0018466 | A1 | 1/2015 | Reynolds | |
| 2018/0171077 | A1 * | 6/2018 | Oka | .......................... C08K 3/26 |

FOREIGN PATENT DOCUMENTS

| JP | S57-10897 B2 | 3/1982 |
| JP | 0815519 A | 1/1996 |
| JP | H08-59832 A | 3/1996 |
| JP | 08-120077 A | 5/1996 |
| JP | H08-157599 A | 6/1996 |
| JP | H08-291252 A | 11/1996 |
| JP | 2003-013351 A | 1/2003 |
| JP | 4789803 B2 | 10/2011 |
| JP | 2012-036382 A | 2/2012 |
| JP | 2012-140582 A | 7/2012 |
| JP | 2013-144750 A | 7/2013 |
| JP | 2013-144751 A | 7/2013 |
| JP | 2014-148601 A | 8/2014 |
| JP | 2014-148602 A | 8/2014 |
| JP | 2015-504952 A | 2/2015 |
| WO | 2005/012423 A1 | 2/2005 |

OTHER PUBLICATIONS

Jun. 25, 2019 Office Action issued in Japanese Application No. 2015-187422.

* cited by examiner

*Primary Examiner* — James Sanders
(74) *Attorney, Agent, or Firm* — Oliff PLC

(57) ABSTRACT

A polyimide precursor composition in which a resin and an organic amine compound are dispersed in an aqueous solvent, wherein the aqueous solvent contains 50% by weight or more of water and at least one organic solvent selected from a solvent group A consisting of a urea solvent, an amide solvent containing an alkoxy group, and an amide solvent containing an ester group in an amount of 5% by weight or more with respect to the total amount of the aqueous solvent, and the resin has a repeating unit represented by the following formula (I):

$$\left( \begin{array}{c} HOOC \\ \\ N-C \\ | \phantom{xx} \| \\ H \phantom{xx} O \end{array} \begin{array}{c} \\ A \\ \end{array} \begin{array}{c} O \phantom{xx} H \\ \| \phantom{xx} | \\ C-N-B \\ \\ COOH \end{array} \right) \quad (I)$$

wherein A indicates a tetravalent organic group, and B indicates a bivalent organic group.

20 Claims, No Drawings

POLYIMIDE PRECURSOR COMPOSITION, METHOD OF PREPARING POLYIMIDE PRECURSOR COMPOSITION, AND METHOD OF PREPARING POLYIMIDE MOLDED ARTICLE

CROSS-REFERENCE TO RELATED APPLICATIONS

This application is based on and claims priority under 35 USC 119 from Japanese Patent Application No. 2015-187422 filed Sep. 24, 2015.

BACKGROUND

1. Technical Field

The present invention relates to a polyimide precursor composition, a method of preparing the polyimide precursor composition, and a method of preparing a polyimide molded article.

2. Related Art

A polyimide resin is a material having high durability and excellent heat resistance, and is widely used as an electronic material.

SUMMARY

According to an aspect of the invention, there is provided a polyimide precursor composition in which a resin and an organic amine compound are dispersed in an aqueous solvent, wherein the aqueous solvent contains 50% by weight or more of water and at least one organic solvent selected from a solvent group A consisting of a urea solvent, an amide solvent containing an alkoxy group, and an amide solvent containing an ester group in an amount of 5% by weight or more with respect to the total amount of the aqueous solvent, and the resin has a repeating unit represented by the following formula (I):

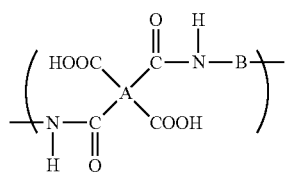

wherein A indicates a tetravalent organic group, and B indicates a bivalent organic group.

DETAILED DESCRIPTION

Hereinafter, exemplary embodiments of the invention will be described in detail.

Polyimide Precursor Composition

A polyimide precursor composition according to the exemplary embodiment is a polyimide precursor composition obtained by dissolving a resin and an organic amine compound in an aqueous solvent. The aqueous solvent contains 50% by weight or more of water and contains at least one type of organic solvent which is selected from a solvent group A so as to be equal to or greater than 5% by weight for the total amount of the aqueous solvent. The solvent group A is a group consisting of a urea solvent, an amide solvent containing an alkoxy group, and an amide solvent containing an ester group. The resin (referred to as "a specific polyimide precursor" below) has a repeating unit represented by the formula (I).

That is, the specific polyimide precursor and the organic amine compound are contained in the composition, in a state of being dissolved in the aqueous solvent. Dissolution represents a state where visual confirmation of the remains of the lysate is impossible. The aqueous solvent represents a solvent which contains 50% by weight or more of at least water.

Here, in the polyimide precursor composition according to the exemplary embodiment, if the organic amine compound is dissolved in the aqueous solvent which contains 50% by weight or more of water and the organic solvent, the specific polyimide precursor (carboxyl group thereof) becomes in a state of having a form of an amine salt, by the organic amine compound. Thus, solubility of the specific polyimide precursor for the aqueous solvent is improved. When a polyimide molded article is molded, the organic amine compound exhibits an imidization acceleration action. Thus, a polyimide resin molded article which is excellent in various characteristics such as mechanical strength, heat resistance, an electrical characteristic, and solvent-resistance is easily obtained. In addition, productivity is also improved by the imidization acceleration action. Accordingly, the polyimide precursor composition containing the organic amine compound is appropriate for a composition for forming the polyimide molded article.

However, if the aqueous solvent is used, when the polyimide molded article (also referred to as "a molded article") is obtained by applying the polyimide precursor composition onto a base and then performing a heat treatment, whitening may occur on a surface (also referred to as "a back surface" below) on which the polyimide precursor composition comes into contact with the base. The reason is considered that balance in time between volatilization of the aqueous solvent, the imidization reaction of the polyimide precursor, an orientation and re-stabilization of the resin in the film occurring by both of the phenomena is lost in the middle of heating such as drying and baking, when a polyimide molded article is molded. That is, it is considered that whitening occurs in the back surface of the polyimide molded article because a state where volatilization of the aqueous solvent and/or the progress of the imidization reaction of the polyimide precursor is performed fast, following of the orientation and re-stabilization of the resin in the film is impossible, and the resin is precipitated in the vicinity of the back surface on which convection of the aqueous solvent in the film is difficult occurs. The whitening on the back surface of the polyimide molded article occurs when a polyimide molded article which has a layer shape and has a film thickness of 30 μm or more (particularly, 50 μm or more) is formed.

On the contrary, in the polyimide precursor composition according to the exemplary embodiment, an aqueous solvent in which 50% by weight or more of water is contained and at least one type of organic solvent selected from the above specific solvent group A is contained so as to have a ratio of 5% by weight or more to the total amount of the aqueous solvent is applied as the aqueous solvent, and thus, the occurrence of whitening on the back surface of the polyimide molded article is prevented.

The reason thereof is not clear. However, the reason is considered as follows. A polar group of each of organic solvents in the specific solvent group A used along with water interacts with both of the water and a polar group (amide group or carboxyl group) of the specific polyimide precursor, and thus solubility and dispersion stability of the polyimide precursor in an aqueous solvent in which 50% by weight or more of water is contained are also improved. An example of the polar group includes a urea group in a case of the urea solvent, an alkoxy group and an amide group in a case of the amide solvent containing the alkoxy group, and an ester group and an amide group in a case of the amide solvent containing the ester group. Thus, the balance in time between volatilization of the aqueous solvent, the imidization reaction of the polyimide precursor, an orientation and re-stabilization of the resin in the film occurring by both of the phenomena is improved in the middle of heating such as drying and baking, when a polyimide molded article is molded, and occurrence of a state which acts as a cause of whitening is prevented. In this state, "volatilization of the aqueous solvent and/or the progress of the imidization reaction of the polyimide precursor is performed fast, following of the orientation and re-stabilization of the resin in the film is impossible, and the resin is precipitated in the vicinity of the back surface on which convection of the aqueous solvent in the film is difficult".

Here, the polyimide precursor composition to which the aqueous solvent is applied generally tends to cause viscosity of the composition to be increased, that is, to cause storage stability to become lower when the polyimide precursor composition is stored at the room temperature (for example, 25° C.). If the polyimide precursor composition is refrigerated (for example, stored at −4° C.) in order to compensate for the storage stability at the room temperature, there is a tendency to cause phase separation, solidification, or precipitation of the polyimide precursor to occur and these phenomena do not appear in a polyimide precursor composition to which only an organic solvent in the related art is applied. However, in the polyimide precursor composition according to the exemplary embodiment, an increase of the viscosity when being stored at the normal temperature is prevented, and the occurrence of the phase separation, solidification, or precipitation of the polyimide precursor when being refrigerated is prevented. Thus, the storage stability is excellent in both of a case of room temperature storing and a case of cold storing. The reason thereof is also not clear. However, it is considered that this is because the polar group of each of the organic solvents in the specific solvent group A used along with water interacts with both of the water and the polar group of the specific polyimide precursor and thus the solubility and the dispersion stability of the polyimide precursor in the aqueous solvent are also improved.

Regarding the polyimide precursor composition, moisture is volatilized from a surface of the composition (solution) or a film surface thereof, viscosity is partially increased, and thus a surface film may be formed 1) when the composition is handled during advance preparation before coating, 2) for a period of time from coating with the polyimide precursor composition until the polyimide precursor composition is dried, when defoaming is performed under reduced pressure in order to draw out the air dissolved in the composition. Particularly, if the surface film is formed on the surface of the composition (solution), the dissolved air in the composition is not completely drawn when the polyimide precursor composition to which the aqueous solvent is applied is defoamed under under reduced pressure. Thus, defoaming characteristics may be deteriorated. However, in the precursor composition according to the exemplary embodiment, moisture is not volatilized from the surface of the composition (solution) or the film surface thereof, and a partial increase of the viscosity is prevented even when the moisture is volatilized. Thus, formation of the surface film is prevented, and excellent defoaming characteristics are also obtained. The reason thereof is not clear. However, it is considered that this is because the polar group of each of the organic solvents in the specific solvent group A used along with water interacts with both of the water and the polar group of the specific polyimide precursor, and thus the solubility and the dispersion stability of the polyimide precursor in the aqueous solvent are also improved.

The surface film may be formed on a surface of the film obtained by applying the polyimide precursor composition, during the period of time from coating with the polyimide precursor composition until the polyimide precursor composition is dried. Thus, when a polyimide molded article is formed by performing a heat treatment in this state, and the formed polyimide molded article is separated from the base, a fracture may occur in the polyimide molded article and a crack may occur in the polyimide molded article. It is also considered that the balance in time between volatilization of the aqueous solvent, the imidization reaction of the polyimide precursor, an orientation and re-stabilization of the resin in the film occurring by both of the phenomena is lost in the middle of heating such as drying and baking, when the polyimide molded article is molded. That is, it is considered that the crack occurs in the polyimide molded article since the state where "volatilization of the aqueous solvent and/or the progress of the imidization reaction of the polyimide precursor is performed fast, following of the orientation and re-stabilization of the resin in the film is impossible, and the difference of strength (required as the molded article) between the surface and the inside of a film is increased" occurs. When a polyimide molded article is formed so as to have a layer shape and to have a film thickness of 30 μm or more (particularly, 50 μm or more), the crack occurs in the polyimide molded article. However, in the precursor composition according to the exemplary embodiment, braking of the polyimide molded article is prevented. The reason thereof is not clear. However, it is considered that this is because the polar group of each of the organic solvents in the specific solvent group A used along with water interacts with both of the water and the polar group of the specific polyimide precursor, and thus the solubility and the dispersion stability of the polyimide precursor in the aqueous solvent in which 50% by weight or more of water is contained are also improved. Thus, it is considered that the balance in time between volatilization of the aqueous solvent, the imidization reaction of the polyimide precursor, an orientation and re-stabilization of the resin in the film occurring by both of the phenomena is improved in the middle of heating such as drying and baking, when the polyimide molded article is molded, and the occurrence of the state where "volatilization of the aqueous solvent and/or the progress of the imidization reaction of the polyimide precursor is performed fast, following of the orientation and re-stabilization of the resin in the film is impossible, and the difference of strength (required as the molded article) between the surface and the inside of a molded article is increased" is prevented. The above state acts as a cause of the crack.

Since the aqueous solvent is applied to the polyimide precursor composition according to the exemplary embodiment, the polyimide precursor composition is excellent in an environmental aptitude. When the polyimide molded article using the polyimide precursor composition is molded, reduction of a heating temperature for removal of the solvent, and reduction of a period of time of heating are achieved.

In addition, corrosion of the base being the ground in molding the polyimide molded article is prevented by using the polyimide precursor composition according to the exemplary embodiment, in which the specific polyimide precursor and the organic amine compound are dissolved in the aqueous solvent. It is considered that this is because acidity of the carboxyl group of the specific polyimide precursor is prevented by basicity of the organic amine compound which is contained together in the specific polyimide precursor.

Particularly, in a case where a specific polyimide precursor (that is, aromatic polyimide precursor) in which A indicates a tetravalent aromatic organic group and B indicates a bivalent aromatic organic group in the formula (I) is applied, normally, the specific polyimide precursor has a tendency of dissolution in a solvent being difficult. However, the aqueous solvent is applied as a solvent and the specific polyimide precursor is dissolved in the aqueous solvent by the organic amine compound, in a state of having a form of an amine salt. Thus, even when an aromatic polyimide precursor is applied as the specific polyimide precursor, film preparing properties are high and the environmental aptitude is excellent.

The specific polyimide precursor as the polyimide precursor is not a low-molecular compound. The specific polyimide precursor does not have a structure in which a flexible chain, an aliphatic cyclic structure, or the like is inserted, into a primary structure so as to decrease a force of interaction between high-molecular chains, and thus solubility in a solvent is increased. The aqueous solvent is applied as a solvent, and the specific polyimide precursor (carboxyl group thereof) is deformed so as to be an amine salt by the organic amine compound and is dissolved.

Thus, in a polyimide precursor of the related art, occurrence reduction of molecular weight of the polyimide precursor, which appears in a method for improving solubility, and occurrence of deterioration of mechanical strength of a polyimide molded article by changing a molecular structure of the polyimide precursor are difficult, and the polyimide precursor enables being water-soluble. From this point, a polyimide resin molded, article which is excellent in various characteristics such as heat resistance, an electrical characteristic, and solvent-resistance in addition to mechanical strength is easily obtained.

Further, even when a single water solvent or an aqueous solvent obtained by adding an amide solvent (N,N-dimethylformamide (DMF), N,N-dimethylacetamide (DMAc), or N-methyl-2-pyrrolidone (NMP)) which is normally used, or an organic solvent (water-soluble ether, water-soluble alcohol, or water-soluble ketone) to water is applied, as will be described in Examples (which will be described later), the above-described effects are insufficient.

A technology in which a portion of the specific solvent group A is used as the organic solvent in a composition in which aqueous (water-soluble) polyamide imide, aqueous (water-soluble) polyether imide, or aqueous (water-soluble) precursors thereof are dissolved in an aqueous solvent, is known. Since this technology is different from the related arts in that a skeleton of a used resin is different, phenomena such as whitening on the back surface of the polyimide molded article, deterioration of the storage stability in room temperature storing and cold storing, formation of the surface film, and the crack in the polyimide molded article does not occur. However, mechanical characteristics such as breaking strength and breaking elongation are worse than those of the polyimide resin molded article.

Hereinafter, components of the polyimide precursor composition according to the exemplary embodiment will be described.

Specific Polyimide Precursor

A specific polyimide precursor is a resin (polyamic acid) which has a repeating unit represented by the formula (I).

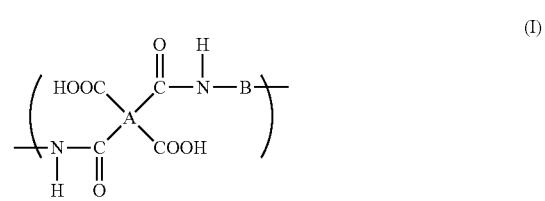

In the formula (I), A indicates a tetravalent organic group and B indicates a bivalent organic group.

Here, the tetravalent organic group indicated by A in the formula (I) corresponds to the remaining group obtained by subtracting four carboxyl groups from a tetracarboxylic dianhydride which is used as a raw material.

The bivalent organic group indicated by B corresponds to the remaining group obtained by subtracting two amino groups from a diamine compound which is used as a raw material.

That is, the specific polyimide precursor which has a repeating unit represented by the formula (I) corresponds to polymer of tetracarboxylic dianhydride and the diamine compound.

As the tetracarboxylic dianhydride, a compound of either of aromatic series and aliphatic series is exemplified. However, the aromatic compound may be used as the tetracarboxylic dianhydride. That is, a tetravalent organic group represented by A in the formula (I) may be an aromatic organic group.

Examples of aromatic tetracarboxylic dianhydride include pyromelletic dianhydride, 3,3',4,4'-benzophenone tetracarboxylic dianhydride, 3,3',4,4'-biphenyl sulfone tetracarboxylic dianhydride, 1,4,5,8-naphthalene tetracarboxylic dianhydride, 2,3,6,7-naphthalene tetracarboxylic dianhydride, 3,3',4,4'-biphenyl ether tetracarboxylic dianhydride, 3,3',4,4'-dimethyl-diphenyl silane tetracarboxylic dianhydride, 3,3',4,4'-tetra phenylsilane tetracarboxylic dianhydride, 1,2,3,4-furan tetracarboxylic dianhydride, 4,4'-bis(3,4-dicarboxy phenoxy)diphenyl sulfide dianhydride, 4,4'-bis(3,4-dicarboxy phenoxy)diphenyl sulfone dianhydride, 4,4'-bis(3,4-dicarboxy phenoxy)diphenyl propane dianhydride, 3,3',4,4'-perfluoro isopropylidenedioxy phthalic dianhydride, 3,3',4,4'-biphenyl tetracarboxylic dianhydride, 2,3,3',4'-biphenyl tetracarboxylic dianhydride, bis(phthalic acid)phenylphosphine oxide dianhydride, p-phenylene-bis(triphenyl phthalic acid)dianhydride, m-phenylene-bis(triphenyl phthalic acid)dianhydride, bis(triphenyl phthalic acid)-4,4'-diphenyl ether dianhydride, bis(triphenyl phthalic acid)-4,4'-diphenylmethane dianhydride.

Examples of aliphatic tetracarboxylic dianhydride include aliphatic or alicyclic tetracarboxylic dianhydride such as butane tetracarboxylic dianhydride, 1,2,3,4-cyclobutane tetracarboxylic dianhydride, 1,3-dimethyl-1,2,3,4-cyclobutane tetracarboxylic dianhydride, 1,2,3,4-cyclopentane tetracarboxylic dianhydride, 2,3,5-tri-carboxy cyclopentyl acetic dianhydride, 3,5,6-tri-carboxy Bruno Rubo Nan-2-acetic acid dianhydride, 2,3,4,5-tetrahydrofuran tetracarboxylic dianhydride, 5-(2,5-di-oxo-tetrahydrofuryl)-3-methyl-3-cyclohexene-1,2-dicarboxylic acid dianhydride, bicyclo[2,2,2]-oct-7-ene-2,3,4,5-tetracarboxylic dianhydride; aliphatic tetracarboxylic dianhydride having an aromatic ring, such as 1,3,3a,4,5,9b-hexahydro-2,5-dioxo-3-furanyl)-naphtho[1,2-c]furan-1,3-dione, 1,3,3a,4,5,9b-hexahydro-5-methyl-5-(tetrahydro-2,5-dioxo-3-furanyl)-naphtho[1,2-c]furan-1,3-dione, and 1,3,3a,4,5,9b-hexahydro-8-methyl-5-(tetrahydro-2,5-dioxo-3-furanyl)-naphtho[1,2-c]furan-1,3-dione.

Among these substances, aromatic tetracarboxylic dianhydride may be used as tetracarboxylic dianhydride. Specifically, for example, pyromelletic dianhydride, 3,3',4,4'-biphenyl tetracarboxylic dianhydride, 2,3,3',4'-biphenyltetracarboxylic dianhydride, 3,3',4,4'-biphenyl ether tetracarboxylic dianhydride, and 3,3',4,4'-benzophenone tetracarboxylic dianhydride may be used. Pyromelletic dianhydride, 3,3',4,4'-biphenyl tetracarboxylic dianhydride, and 3,3',4,4'-benzophenone tetracarboxylic dianhydride may be further used. 3,3',4,4'-biphenyl ether tetracarboxylic dianhydride may be particularly used.

One type of tetracarboxylic dianhydride may be used singly or combination of two or more types of tetracarboxylic dianhydride may be used together.

When combination of two or more types of tetracarboxylic dianhydride is used together, aromatic tetracarboxylic dianhydride or aliphatic tetracarboxylic acid may be used, or combination of aromatic tetracarboxylic dianhydride and aliphatic tetracarboxylic dianhydride may be used.

The diamine compound is a diamine compound having two amino groups in a molecular structure. An example of the diamine compound includes a compound of either of aromatic series and aliphatic series. However, an aromatic compound may be used. That is, a bivalent organic group represented by B in the formula (I) may be an aromatic organic group.

Examples of the diamine compound include aromatic diamine such as p-phenylenediamine, m-phenylenediamine, 4,4'-diaminodiphenylmethane, 4,4'-diaminodiphenyl ethane, 4,4'-diaminodiphenyl ether, 4,4'-diaminodiphenyl sulfide, 4,4'-diamino-diphenyl sulfone, 1,5-diamino-napthalene, 3,3-dimethyl-4,4'-diamine biphenyl, 5-amino-1-(4'-amino phenyl)-1,3,3-trimethyl-indane, 6-amino-1-(4'-amino phenyl)-1,3,3-trimethyl-indane, 4,4'-diamine benzanilide, 3,5-diamino-3'-trifluoromethyl benzanilide, 3,5-diamino-4'-trifluoromethyl benzanilide, 3,4'-diaminophenyl ether, 2,7-diamino-fluorene, 2,2-bis(4-aminophenyl) hexafluoropropane, 4,4'-methylene-bis(2-chloroaniline), 2,2',5,5'-tetrachloro-4,4'-diamino biphenyl, 2,2'-dichloro-4,4'-diamino-5,5'-dimethoxy biphenyl, 3,3'-dimethoxy-4,4'-diamino biphenyl, 4,4'-diamino-2,2'-bis(trifluoromethyl) biphenyl, 2,2-bis[4-(4-aminophenoxy) phenyl]propane, 2,2-bis[4-(4-aminophenoxy) phenyl]hexafluoropropane, 1,4-bis (4-aminophenoxy)benzene, 4,4'-bis(4-aminophenoxy)-biphenyl, 1,3'-bis(4-aminophenoxy)benzene, 9,9-bis(4-aminophenyl)fluorens, 4,4'-(p-phenylene isopropylidene) bisaniline, 4,4'-(m-phenylene isopropylidene)bisaniline, 2,2'-bis[4-(4-amino-2-trifluoromethylphenoxy)phenyl] hexafluoropropane, and 4,4'-bis[4-(4-amino-2-trifluoromethyl)phenoxy]-octafluorobiphenyl; aromatic diamine such as diamino tetraphenyl thiophene, which has two amino groups bonded to an aromatic ring and hetero atoms other than a nitrogen atom of the amino group; aliphatic diamine and alicyclic diamine such as 1,1-metaxylylene diamine, 1,3-propane diamine, tetramethylene diamine, pentamethylene diamine, octamethylene diamine, nonamethylene diamine, 4,4-diamino heptamethylene diamine, 1,4-diamino cyclohexane, isophorone diamine, tetrahydrodicyclopentadienylene diamine, hexahydro-4,7-metanoindanylene dimethylene diamine, and trycyclo[6,2,1,0$^{2.7}$]-undicylene dimethyl diamine, and 4,4'-methylenebis(cyclohexylamine).

Among these substances, the aromatic diamine compound may be used as the diamine compound. Specifically, for example, p-phenylenediamine, m-phenylenediamine, 4,4'-diaminodiphenylmethane, 4,4'-diaminodiphenyl ether, 3,4-diaminodiphenyl ether, 4,4'-diaminodiphenyl sulfide, and 4,4'-diamino-diphenyl sulfone may be used. 4,4'-diaminodiphenyl ether and p-phenylenediamine may be particularly used.

One type of the diamine compound may be used singly or combination of two or more types of diamine compounds may be used together. When combination of two or more types of the diamine compound is used together, an aromatic diamine compound or an aliphatic diamine compound may be used, or combination of the aromatic diamine compound and the aliphatic diamine compound may be used.

The specific polyimide precursor may be a resin which has an imidization rate of 0.2 or less. That is, the specific polyimide precursor may be a resin which has an imidized portion.

Specifically, an example of the specific polyimide precursor includes a resin having a repeating unit which is represented by the formula (I-1), the formula (I-2), and the formula (I-3).

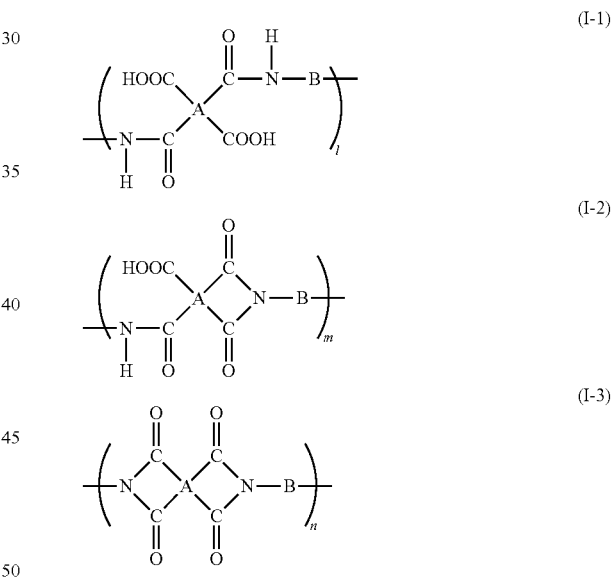

In the formula (I-1), the formula (I-2), and the formula (I-3), A indicates a tetravalent organic group and B indicates a bivalent organic group. A and B have the same meanings as A and B in the formula (I).

l indicates an integer of 1 or more. m and n respectively indicate 0 or an integer of 1 or more.

Here, at a bonded portion (reaction portion between tetracarboxylic dianhydride and the diamine compound) of the specific polyimide precursor, a ratio of the number of imide ring-closed bonded portions (2n+m) to the total number of bonded portions (2l+2m+2n), that is, an imidization rate of the specific polyimide precursor is indicated by "(2n+m)/(2l+2m+2n)". The value of "(2n+m)/(2l+2m+2n)" is preferably equal to or less than 0.2, more preferably equal to or less than 0.15, and most preferably equal to or less than 0.1.

The imidization rate being in this range causes occurrence of gelling or precipitation-separation of the specific polyimide precursor to be prevented.

The imidization rate (value of "(2n+m)/(2l+2m+2n)") of the specific polyimide precursor is measured by the following method.

Measurement of Imidization Rate of Polyimide Precursor

Preparation of Polyimide Precursor Sample (i) A silicone wafer is coated with a polyimide precursor composition to be measured so as to have a film thickness of a range of 1 μm to 10 μm, and thereby a coated film sample is prepared.

(ii) The coated film sample is dipped in tetrahydrofuran (THF) for 20 minutes and a solvent on the coated film sample is exchanged with tetrahydrofuran (THF). The dipping solvent is not limited to THF. A solvent which does not dissolve the polyimide precursor and may be mixed with a solvent component included in the polyimide precursor composition may be selected. Specifically, an alcohol solvent such as methanol and ethanol, and an ether compound such as dioxane may be used.

(iii) The coated film sample is extracted from THF, and THF adhering to the surface of the coated film sample is removed by spraying $N_2$ gas. The coated film sample obtained through treatment under reduced pressure of 10 mmHg or less at a temperature range of 5° C. to 25° C. for 12 hours or longer is dried, and thereby the polyimide precursor sample is prepared.

Preparation of 100% Imidized Standard Sample (iv) Similarly to the (i), a silicone wafer is coated with a polyimide precursor composition to be measured and thereby a coated film sample is prepared.

(v) An imidization reaction is performed by heating the coated film sample at 380° C. for 60 minutes, and thereby a 100% imidized standard sample is prepared.

Measurement and Analysis (vi) Infrared absorption spectra of the 100% imidized standard sample and the polyimide precursor sample are measured by a Fourier transform infrared spectrophotometer (FT-730 manufactured by HORIBA, Ltd.). A ratio I'(100) of an absorption peak (Ab' (1780 $cm^{-1}$)) derived from imide bonds in the vicinity of 1780 $cm^{-1}$ to an absorption peak (Ab' (1500 $cm^{-1}$)) derived from an aromatic ring in the vicinity of 1500 $cm^{-1}$ of the 100% imidized standard sample is obtained.

(vii) Similarly, the polyimide precursor sample is measured and thus a ratio I(x) of an absorption peak (Ab (1780 $cm^{-1}$)) derived from imide bonds in the vicinity of 1780 $cm^{-1}$ to an absorption peak (Ab (1500 $cm^{-1}$)) derived from an aromatic ring in the vicinity of 1500 $cm^{-1}$ is obtained.

An imidization rate of the polyimide precursor is calculated based on the following expressions by using the measured absorption peaks I'(100) and I(x).

$$\text{imidization rate of polyimide precursor} = I(x)/I'(100) \quad \text{Expression}$$

$$I'(100) = (Ab'(1780\ cm^{-1}))/(Ab'(1500\ cm^{-1})) \quad \text{Expression}$$

$$I(x) = (Ab(1780\ cm^{-1}))/(Ab(1500\ cm^{-1})) \quad \text{Expression}$$

Measurement of the imidization rate of this polyimide precursor is applied to measurement of an imidization rate of an aromatic polyimide precursor. When an imidization rate of an aliphatic polyimide precursor is measured, a peak derived from a structure which is not changed before and after the imidization reaction is used as an internal standard peak, instead of an absorption peak of the aromatic ring.

Terminal Amino Group of Polyimide Precursor

The specific polyimide precursor may contain the polyimide precursor (resin) which has an amino group at a terminal thereof. Preferably, the polyimide precursor may have amino groups at all terminals thereof.

In order to provide the amino group at the terminal of molecules of the specific polyimide precursor, for example, a molar equivalent of the diamine compound used during a polymerization reaction is added more than a molar equivalent of tetracarboxylic dianhydride. A ratio of the molar equivalents of tetracarboxylic dianhydride and the diamine compound is preferably in a range of 0.92 to 0.9939, and more preferably in a range of 0.93 to 0.999 when the molar equivalent of the diamine compound is set to 1.

If the ratio of the molar equivalents of the diamine compound and tetracarboxylic dianhydride is equal to or greater than 0.9, an effect of the amino group at the terminal of the molecules is increased, and good dispersability is easily obtained. If the ratio of the molar equivalents thereof is equal to or smaller than 0.9999, the molecular weight of the obtained polyimide precursor is increased. For example, when a layer-shaped (film-shaped) polyimide molded article is used, sufficient film strength (tear strength and tensile strength) of the layer-shaped polyimide molded article is easily obtained.

The terminal amino group of the specific polyimide precursor is detected by acting the polyimide precursor composition with trifluoroacetic anhydride (quantitative reaction with amino group). That is, the terminal amino group of the specific polyimide precursor is subjected to trifluoroacetylation by using trifluoroacetic anhydride. After treatment, the specific polyimide precursor is refined through re-precipitation or the like, and thus surplus trifluoroacetic anhydride and a trifluoro acetic acid residue are removed. Regarding the treated specific polyimide precursor, the quantity of fluorine atoms inserted into the polyimide precursor is determined by a nuclear magnetic resonance device (19F-NMR), and thus, the quantity of the terminal amino groups of the specific polyimide precursor is measured.

The number average molecular weight of the specific polyimide precursor may be from 5,000 to 100,000, preferably is from 7,000 to 50,000, and more preferably is from 10,000 to 30,000.

If the number average molecular weight of the specific polyimide precursor is in the above range, good solubility of the polyimide precursor in the composition and good mechanical characteristics of a film obtained after preparing are obtained.

The ratio of the molar equivalents of the tetracarboxylic dianhydride and the diamine compound is adjusted, and thus a specific polyimide precursor having a desired number average molecular weight is obtained.

The number average molecular weight of the specific polyimide precursor is measured by using a gel permeation chromatography (GPC) method having the following measurement conditions.

Column: TSKgel α-M (manufactured by Tosoh Corporation) (7.8 mm, I.D×30 cm)

Eluent: DMF (dimethylformamide)/30 mM LiBr/60 mM phosphoric acid

Flow speed: 0.6 mL/min

Injection volume: 60 μL

Detector: RI (differential refractive index detector)

A content (concentration) of the specific polyimide precursor may be from 0.1% by weight to 40% by weight for the entirety of the polyimide precursor composition, preferably from 0.5% by weight to 25% by weight, and more preferably from 1% by weight to 20% by weight.

Organic Amine Compound

An organic amine compound is a compound which causes solubility for the solvent to be improved by causing the specific polyimide precursor (carboxyl group thereof) to be changed to be amine salt, and also functions as an imidization accelerator. The organic amine compound may be a compound excluding a diamine compound which is a raw material of the polyimide precursor.

The organic amine compound may be a water-soluble compound. Here, being water-soluble means that 1% by weight or more of a target material is dissolved in water at 25° C.

The organic amine compound may be any of a chain amine compound and a cyclic (monocyclic, polycyclic) amine compound by a classification of the skeleton. The organic amine compound may be any of an aliphatic amine compound and an aromatic amine compound by a classification of the skeleton, and the aliphatic amine compound is preferable. The organic amine compound may be an amine compound in which a functional group having a heteroelement in the skeleton or as a substituent is provided.

As the organic amine compound by the classification of the skeleton, for example, a chain or branched aliphatic amine, an imidazole compound, an aliphatic cyclic amine compound, and the like are preferable.

As the organic amine compound by the classification of the skeleton, for example, an amine compound having a heterocyclic structure which contains nitrogen is also preferable. Examples of the aliphatic or aromatic cyclic amine compound (referred to as "a nitrogen-containing heterocyclic amine compound" below) which has a heterocyclic structure containing nitrogen include isoquinolines (amine compound having an isoquinoline skeleton), pyridines (amine compound having a pyridine skeleton), pyrimidines (amine compound having a pyrimidine skeleton), pyrazines (amine compound having a pyrazine skeleton), piperazines (amine compound having a piperazine skeleton), triazines (amine compound having a triazine skeleton), imidazoles (amine compound having an imidazole skeleton), morpholines (amine compound having a morpholine skeleton), 1,4-diazabicyclo[2.2.2]octane (DABCO, polyaniline, polypyridine, and the like.

The organic amine compound may be any of a primary amine compound, a secondary amine compound, and a tertiary amine compound, by a classification other than the classification of the skeleton. Among these compounds, the organic amine compound may be at least one (particularly, tertiary amine compound) selected from the secondary amine compound and the tertiary amine compound. If the tertiary amine compound or the secondary amine compound (particularly, tertiary amine compound) is applied as the organic amine compound, the solubility of the specific polyimide precursor for the aqueous solvent is easily improved. Thus, the occurrence of whitening on the back surface of the polyimide molded article is easily prevented. The storage stability of the polyimide precursor composition is easily improved.

Examples of the primary amine compound include methylamine, ethylamine, n-propylamine, isopropylamine, 2-ethanolamine, 2-amino-2-methyl-1-propanol, and the like.

Examples of the secondary amine compound include dimethylamine, 2-(methylamino)ethanol, 2-(ethylamino)ethanol, morpholine, and the like.

Examples of the tertiary amine compound include 2-dimethylaminoethanol, 2-diethylaminoethanol, 2-dimethylamino-propanol, pyridine, triethylamine, picoline, methylmorpholine, ethylmorpholine, 1,2-dimethyl imidazole, 2-ethyl-4-methylimidazole, and the like.

A compound which has a boiling point of 60° C. or more (preferably, 60° C. to 200° C., and more preferably 70° C. to 150° C.) may be used as the organic amine compound.

If the boiling point of the organic amine compound is equal to or higher than 60° C., volatilization of the organic amine compound from the polyimide precursor composition when being stored is prevented, and deterioration of solubility of the specific polyimide precursor for the aqueous solvent is easily prevented.

The ratio of the contained organic amine compound to the carboxyl group contained in the specific polyimide precursor may be from 50 mol % to 500 mol %, The ratio may be preferably from 80 mol % to 400 mol %, and more preferably from 100 mol % to 300 mol %.

If the content of the organic amine compound is in the above range, the solubility of the specific polyimide precursor for the aqueous solvent is easily improved. Thus, the occurrence of whitening on the back surface of the polyimide molded article is easily prevented. Particularly, excellent storage stability is easily obtained by containing the organic amine compound so as to be greater than the quantity of the carboxyl group.

Aqueous Solvent

The aqueous solvent is a solvent in which 50% by weight or more of at least water is contained in an aqueous solvent.

Examples of the water include distilled water, ion-exchange water, ultra-filtered water, pure water, and the like.

The content of the water to the aqueous solvent is preferably from 50% by weight to 95% by weight, more preferably from 60% by weight to 90% by weight, and further preferably from 65% by weight to 85% by weight.

The aqueous solvent also contains 5% by weight, or more of at least one organic solvent (referred to as an organic solvent of the solvent group A below) selected from the solvent group A. The solvent group A is a group consisting of a urea solvent, an amide solvent containing an alkoxy group, and an amide solvent containing an ester group.

Urea Solvent

The urea solvent is a solvent having a urea group (N—C(=O)—N). Specifically, the urea solvent may be a solvent having a structure of "*—N(Ra$^1$)—C(=O)—N(Ra$^2$)—*". Here, each of Ra$^1$ and Ra$^2$ indicates a hydrogen atom, an alkyl group, a phenyl group, or a phenyl alkyl group. *s at both terminals of two nitrogen atoms indicate bonded portions to other atoms of the structure. The urea solvent may be a solvent having a ring structure in which *s at both terminals of two nitrogen atoms are linked to each other through alkylene, —O—, —C(=O)—, or a link group formed from combination thereof.

The alkyl group indicated by Ra$^1$ and Ra$^2$ may have any of a chain shape, a branch shape, and a cyclic shape, and have a substituent. A specific example of the alkyl group includes an alkyl group (for example, a methyl group, an ethyl group, a n-propyl group, an i-propyl group, a n-butyl group, and the like) having a carbon number of 1 to 6 (preferably 1 to 4).

Examples of the substituent of the alkyl group includes an alkoxy group having a carbon number of 1 to 4, a hydroxyl group, a ketone group, an ester group, an alkyl carbonyloxy group, and the like.

A specific example of the ketone group includes a methyl carbonyl group (acetyl group), an ethyl carbonyl group, a n-propyl carbonyl group, and the like. A specific example of the ester group includes a methoxy carbonyl group, an ethoxy carbonyl group, a n-propoxy carbonyl group, an acetoxy group, and the like. A specific example of the alkyl carbonyloxy group includes a methyl carbonyloxy group (acetyloxy group), an ethyl carbonyloxy group, a n-propyl carbonyloxy group, and the like.

A phenyl skeleton of the phenyl group and the phenyl alkyl group indicated by $Ra^1$ and $Ra^2$ may have a substituent. An example of the substituent of the phenyl skeleton includes the same groups as the substituent of the alkyl group.

In a case where the urea solvent has a ring structure in which *s at both of the terminals of the two nitrogen atoms are linked to each other, the number of members of the ring may be 5 or 6.

Examples of the urea solvent include 1,3-dimethyl urea, 1,3-diethyl urea, 1,3-diphenyl urea, 1,3-dicyclohexyl urea, tetramethyl urea, tetraethyl urea, 2-imidazolidinone, propylene urea, 1,3-dimethyl-2-imidazolidinone, N,N-dimethyl propylene urea, and the like.

Among these substances, from a viewpoint of prevention of the occurrence of the crack in the polyimide molded article, and improvement of the storage stability at the room temperature and in a refrigerator, as the urea solvent, 1,3-dimethyl urea, 1,3-diethyl urea, tetramethyl urea, tetraethyl urea, 1,3-dimethyl-2-imidazolidinone, and N,N-dimethyl propylene are preferable, and tetramethyl urea, tetraethyl urea, 1,3-dimethyl-2-imidazolidinone, and N,N-dimethyl propylene urea are most preferable.

Alkoxy Group Amide Solvent and Amide Solvent Containing Ester Group

The amide solvent containing an alkoxy group is a solvent which has an alkoxy group and an amide group. The amide solvent containing an ester group is a solvent which has an ester group and an amide group. An example of the alkoxy group and the ester group includes groups similar to the alkoxy group and the ester group which are exemplified as "the substituent of the alkyl group indicated by $Ra^1$ and $Ra^2$" in the descriptions for the urea solvent. The amide solvent containing an alkoxy group may have an ester group and the amide solvent containing an ester group may have an alkoxy group.

Descriptions will be made below by referring to both of the amide solvent containing an alkoxy group and the amide solvent containing an ester group as "an amide solvent containing an alkoxy group or an ester group".

The amide solvent containing an alkoxy group or an ester group is not particularly limited. However, specifically, an amide solvent represented by the following formula (Am1), an amide solvent represented by the following formula (Am2), and the like are appropriately exemplified.

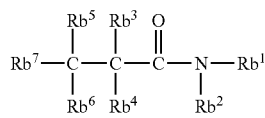

(Am1)

In the formula (Am1), each of $Rb^1$, $Rb^2$, $Rb^3$, $Rb^4$, $Rb^5$, and $Rb^6$ indicates a hydrogen atom or an alkyl group. $Rb^7$ indicates an alkoxy group or an ester group.

The alkyl group indicated by $Rb^1$ to $Rb^6$ is the same as "the alkyl group indicated by $Ra^1$ and $Ra^2$" in the descriptions for the urea solvent.

The alkoxy group and the ester group indicated by $Rb^7$ are the same as the alkoxy group and the ester group exemplified as "the substituent of the alkyl group indicated by $Ra^1$" and $Ra^2$" in the descriptions for the area solvent.

Specific examples of the amide solvent represented by the formula (Am1) are shown below. However, the amide solvent is not limited thereto.

| Exemplary Compound No. | $Rb^1$ | $Rb^2$ | $Rb^3$ | $Rb^4$ | $Rb^5$ | $Rb^6$ | $Rb^7$ |
|---|---|---|---|---|---|---|---|
| B-1 | Me | Me | H | H | H | H | —$CO_2$Me |
| B-2 | Me | Me | H | H | H | H | —$CO_2$Et |
| B-3 | Et | Et | H | H | H | H | —$CO_2$Me |
| B-4 | Me | Me | H | H | H | H | —OMe |
| B-5 | Me | Me | H | H | H | H | —OEt |
| B-6 | Me | Me | H | H | H | H | —OnPr |
| B-7 | Me | Me | H | H | H | H | —OnBu |
| B-8 | Et | Et | H | H | H | H | —OMe |
| B-9 | Me | Me | H | H | H | H | —OC(=O)Me |
| B-10 | Me | Me | Me | H | H | H | —OMe |

In the specific example of the amide solvent represented by the formula (Am1), Me corresponds to a methyl group, Et corresponds to an ethyl group, nPr corresponds to a n-propyl group, and nBu corresponds to a n-butyl group.

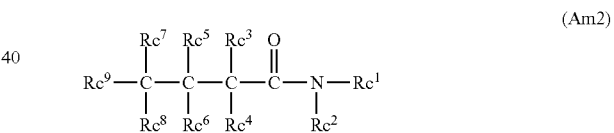

(Am2)

(In the formula (Am2), each of $Rc^1$, $Rc^2$, $Rc^3$, $Rc^4$, $Rc^5$, $Rc^6$, $Rc^7$, and $Rc^8$ indicates a hydrogen atom or an alkyl group. $Rc^9$ indicates an alkoxy group or an ester group.

An alkyl group, indicated by $Rc^1$ to $Rc^8$ is the same as "the alkyl group indicated by $Ra^1$ and $Ra^2$" in the descriptions for the urea solvent.

An alkoxy group and an ester group indicated by $Rc^9$ is the same as the alkoxy group and the ester group exemplified as "the substituent of the alkyl group indicated by $Ra^1$ and $Ra^2$" in the descriptions for the urea solvent.

Specific examples of the amide solvent represented toy the formula (Am2) are shown below. However, the amide solvent is not limited thereto.

| Exemplary Compound No. | $Rc^1$ | $Rc^2$ | $Rc^3$ | $Rc^4$ | $Rc^5$ | $Rc^6$ | $Rc^7$ | $Rc^8$ | $Rc^9$ |
|---|---|---|---|---|---|---|---|---|---|
| C-1 | Me | Me | H | H | H | H | H | H | —$CO_2$Me |
| C-2 | Me | Me | Me | H | H | H | H | H | —$CO_2$Me |
| C-3 | Me | Me | H | H | H | H | Me | H | —$CO_2$Me |

-continued

| Exemplary Compound No. | Rc¹ | Rc² | Rc³ | Rc⁴ | Rc⁵ | Rc⁶ | Rc⁷ | Rc⁸ | Rc⁹ |
|---|---|---|---|---|---|---|---|---|---|
| C-4 | Et | Et | H | H | H | H | H | H | —OMe |
| C-5 | Me | Me | H | H | Me | H | H | H | —CO$_2$Me |
| C-6 | Me | Me | H | H | H | H | H | H | —CO$_2$Et |
| C-7 | Me | Me | H | H | H | H | Me | H | —CO$_2$Et |
| C-8 | Me | Me | H | H | H | H | H | H | —OC(=O)Me |
| C-9 | Me | Me | H | H | H | H | H | H | —OEt |
| C-10 | Me | Me | H | H | H | H | H | H | —OnPr |

In the specific example of the amide solvent represented by the formula (Am2), Me corresponds to a methyl group, Et corresponds to an ethyl group, and nPr corresponds to a n-propyl group.

Among these substances, from a viewpoint of prevention of the occurrence of the crack in the polyimide molded article, and improvement of the storage stability at the room temperature and in a refrigerator, as the amide solvent containing an alkoxy group or an ester group, 3-methoxy-N,N-dimethyl propanamide (exemplary compound B-4), 3-n-butoxy-N,N-dimethyl propanamide (exemplary compound B-7), methyl 5-dimethyl amino-2-methyl-5-oxo-pentanate (exemplary compound C-3) are preferably, and 3-methoxy-N,N-dimethyl propanamide (exemplary compound B-4) is more preferable.

From a viewpoint of prevention of the occurrence of the crack in the polyimide molded article, and improvement of the storage stability at the room temperature and in a refrigerator, the solvent group A is preferably a solvent group consisting of tetramethyl urea, tetraethyl urea, 1,3-dimethyl-2-imidazolidinone, N,N-dimethyl propylene urea, and 3-methoxy-N,N-dimethyl propanamide.

Boiling Point of Organic Solvent of Solvent Group A

The boiling point of an organic solvent of the solvent group A (boiling point of each of organic solvents of the specific solvent group A) is, for example, preferably from 100° C. to 350° C., more preferably from 120° C. to 300° C., and further preferably from 150° C. to 250° C. If the boiling point of an organic solvent of the solvent group A is set to be equal to or higher than 100° C., volatilization of the organic solvent is prevented. In addition, the occurrence of whitening on the back surface of the polyimide molded article, deterioration of storage stability in the room temperature storing and cold storing, formation of a surface film, and the occurrence of the crack in the polyimide molded article are easily prevented. If the boiling point of an organic solvent of the solvent group A is set to be equal to or lower than 350° C. (particularly, being equal to or lower than 250° C.), occurrence of the remains of the organic solvent of the solvent group A in the polyimide molded article is prevented, and deterioration of mechanical strength of the polyimide molded article is easily prevented. Deterioration of various other physical characteristics thereof is also easily prevented.

Characteristics and the Like of Organic Solvent

The molecular weight of an organic solvent of the solvent group A is not limited as long as the boiling point is in the above range. However, the molecular weight of an organic solvent of the solvent group A may be generally equal to or less than 500.

Regarding the organic solvent of the solvent group A, an organic solvent which is solid at a normal temperature and normal pressure may be used as long as an organic solvent has a liquid phase at the normal temperature and the normal pressure (25° C., atmospheric pressure) when an aqueous solvent is used as the organic solvent (that is, when the organic solvent is obtained by mixing water).

The content of the organic solvent of the solvent group A (ratio of the organic solvent of the solvent group A to the total amount) is equal to or greater than 5% by weight for the aqueous solvent, preferably from 5% by weight to 50% by weight, more preferably from 10% by weight to 40% by weight, and further preferably from 15% by weight to 35% by weight.

If the content of the organic solvent of the solvent group A is equal to or greater than 5% by weight, the occurrence of whitening on the back surface of the polyimide molded article is prevented. In addition, deterioration of storage stability in the room temperature storing and the cold storing, formation of the surface film, the occurrence of the crack in the polyimide molded article are prevented. If the content of the organic solvent is equal to or less than 50% by weight, the environmental aptitude of the composition is ensured. In addition, the occurrence of the remains of the organic solvent of the solvent group A in the polyimide molded article is prevented, and deterioration of the mechanical strength of the polyimide molded article is easily prevented. Deterioration of various other physical characteristics is also easily prevented.

Here, if the content of the organic solvent of the solvent group A is set to be from 10% by weight to 40% by weight (particularly, from 15% by weight to 35% by weight), the occurrence of whitening on the back surface of the polyimide molded article is prevented. In addition, deterioration of storage stability in the room temperature storing and the cold storing, and formation of the surface film are prevented.

Organic Solvent out of Solvent Group A

The aqueous solvent may contain an organic solvent out of the solvent group A as long as a condition in which the content of water is equal to or greater than 50% by weight, the content of the organic solvent of the solvent group A is equal to or greater than 5% by weight is satisfied. In this case, a ratio of the organic solvent of the solvent group A and an organic solvent out of the solvent group A is not limited.

Examples of the organic solvent out of the solvent, group A include an aprotic polar solvent, a water-soluble ether solvent, a water-soluble ketone solvent, a water-soluble alcohol solvent, and the like. Here, being water-soluble means that 1% by weight or more of a target material is dissolved in water at 25° C.

The aprotic polar solvent is a solvent which is generally used as a solvent for a polyimide precursor and has a dipole moment of 3.0 D to 5.9 D. Specifically, examples of the aprotic polar solvent include γ-butyrolactone, N-methyl pyrrolidone (NMP), N,N-dimethylformamide (DMF), N,N-dimethylacetamide (DMAc), N-ethyl pyrrolidone (NEP), dimethyl sulfoxide (DMSO), hexamethyl phosphoramide (HMPA), N-methyl caprolactam, N-acetyl-2-pyrrolidone, and the like.

The water-soluble ether solvent is a water-soluble solvent in which ether linkage is included in one molecule. Examples of the water-soluble ether solvent include tetrahydrofuran (THF), dioxane, trioxane, 1,2-dimethoxyethane, diethylene glycol dimethyl ether, diethylene glycol diethyl ether, and the like.

The water-soluble ketone solvent is a water-soluble solvent in which a ketone group is included in one molecule. Examples of the water-soluble ketone solvent include acetone, methyl ethyl ketone, cyclohexanone, and the like.

The water-soluble alcohol solvent is a water-soluble solvent in which an alcoholic hydroxyl group is included in one molecule. Examples of the water-soluble alcohol solvent include methanol, ethanol, 1-propanol, 2-propanol, tert-butyl alcohol, ethylene glycol, 1,2-propanediol, 1,3-propanediol, 1,3-butanediol, 1,4-butanediol, 2,3-butanediol, 1,5-pentanediol, 2-butene-1,4-diol, 2-methyl-2,4-pentanediol, glycerin, 2-ethyl-2-hydroxymethyl-1,3-propanediol, 1,2,6-hexanetriol, and the like.

The boiling point of the organic solvent out of the solvent group A may be equal to or lower than 160° C., is preferably from 40° C. to 150° C., and more preferably from 50° C. to 120° C. If the boiling point is set to be in the above range, remaining of the solvent on the polyimide molded article becomes difficult, and a polyimide molded article having high mechanical strength is easily obtained.

Other Additives

The polyimide precursor composition according to the exemplary embodiment has a purpose for applying various functions such as conductivity and mechanical strength to a polyimide molded article prepared by using the polyimide precursor composition. Thus, the polyimide precursor composition may contain various fillers and the like. That is, the polyimide precursor composition may contain a catalyst for accelerating the imidization reaction, a leveling material for improving quality of a prepared film, or the like.

An example of a conductive material added for applying conductivity includes a conductive material (for example, volume resistivity being less than $10^7$ Ω·cm, this is similar below) or a semiconductive material (for example, volume resistivity being from $10^7$ Ω·cm to $10^{13}$ Ω·cm, this is similar below). These conductive materials are selected in accordance with a use purpose.

An example of a conducting agent includes carbon black (for example, acidic carbon black being equal to or less than pH 5.0), metal (for example, aluminum, nickel, and the like), metal oxide (for example, yttrium oxide, tin oxide, and the like), an ion conductive material (for example, potassium titane, LiCl, and the like), a conductive polymer (for example, polyaniline, polypyrrole, polysulfone, polyacetylene, and the like), and the like.

One type of the conductive material may be singly used or combination of two types may be used.

When the conductive material has a particle shape, the conductive material may be particles having a primary particle size being less than 10 μm, and preferably being equal to or less than 1 μm.

An example of the filler added for improving the mechanical strength includes a particle-shaped material such as silica powder, alumina powder, barium sulfate powder, titanium oxide powder, mica, and talc. Fluororesin powder such as polytetrafluoro ethylene (PTFE) and tetrafluoroethylene perfluoroalkyl vinyl ether copolymer (PFA), and the like maybe added for improving water repellency and release properties on the surface of the polyimide molded article.

As the catalyst for accelerating the imidization reaction, a dehydrating agent such as acidic anhydride, and an acidic catalyst such as a phenol derivative, a sulfonic acid derivative, and a benzoic acid derivative may be used.

A surfactant may be added for improving quality of a prepared film using the polyimide molded article. The surfactant to be used may be cationic, anionic, or nonionic.

The content of the other additives may be selected in accordance with a use purpose of the prepared polyimide molded article.

Preparing Method of Polyimide Precursor Composition

The preparing method of the polyimide precursor composition according to the exemplary embodiment is not particularly limited. For example, the following method is included.

(A) A method of obtaining a resin (also referred to as "a polyimide precursor" below) which has a repeating unit represented by the following formula (I) by polymerizing tetracarboxylic dianhydride and an diamine compound in an aqueous solvent (also referred to as "a specific aqueous solvent" below), in a state where the organic amine compound is present. The specific aqueous solvent contains 50% by weight or more of water and contains at least one type of organic solvent which is selected from a solvent group A so as to be equal to or greater than 5% by weight for the total amount of the aqueous solvent.

(B) A method in which after a polyimide precursor is formed by polymerizing tetracarboxylic dianhydride and a diamine compound in a well-known solvent, the solvent is substituted with the specific aqueous solvent through a solvent substitution process, and then or simultaneously, an organic amine is added.

Regarding the preparing method of the polyimide precursor composition according to the exemplary embodiment, the preparing method (A) is preferable in that a polyimide precursor composition is easily obtained.

Here, the known solvent is not particularly limited as long as the known solvent is a solvent which causes a polyimide precursor to be obtained by polymerization. An example of the known solvent includes an aprotic polar solvent (for example, γ-butyrolactone, DMAc, NMP, and the like), a THF/methanol solvent mixture, and the like.

Examples of the solvent substitution process include a process of adding the specific aqueous solvent after the original solvent is removed by heating or evacuating the solvent, a process of adding the specific aqueous solvent after a solid of the polyimide precursor is extracted by re-sedimentation, and the like. In all of the processes, if necessary, a dry process may be performed before the specific aqueous solvent is added.

The reaction temperature during a polymerization reaction of the polyimide precursor may be, for example, from 0° C. to 70° C., preferably be from 10° C. to 60° C., and more preferably be from 20° C. to 55° C. The reaction temperature is set to be equal to or higher than 0° C., and thus progress of the polymerization reaction is accelerated, a period of time required for the reaction is reduced, and productivity is easily improved. If the reaction temperature is equal to or lower than 70° C., progress of the imidization reaction occurring in molecules of the prepared polyimide precursor is prevented, and precipitation or gelling occurring by deterioration of solubility of the polyimide precursor is easily prevented.

The period of time during the polymerization reaction of the polyimide precursor may be in a range from one hour to 24 hours, in accordance with the reaction temperature.

Usage Example of Polyimide Precursor Composition

The polyimide precursor composition according to the exemplary embodiment is used as a coating liquid for forming a polyimide molded article. An example of the coating liquid for forming a polyimide molded article includes a coating liquid for forming a polyimide film, a coating liquid for forming a polyimide coating film, and the like.

As the polyimide film used as the polyimide molded article, a flexible electronic board film, a copper-clad laminated film, a laminate film, an electrically-insulating film, a porous film for a fuel cell, a separation film, and the like are exemplified.

As the polyimide coating film used as the polyimide molded article, an insulation coating film, a thermal resistance coating film, an IC package, an adhesive film, a liquid crystal orientation film, a resist film, a planarization film, a microlens array film, an electric wire coating film, an optical fiber coating film, and the like are exemplified.

As other polyimide molded articles, a belt member is included. As the belt member, a driving belt, a belt (for example, an intermediate belt, a transfer belt, a fixation belt, and a transporting belt) for an electrophotographic image forming apparatus, and the like are exemplified.

Preparing Method of Polyimide Molded Article

The preparing method of the polyimide molded article according to the exemplary embodiment is a method of obtaining a polyimide molded article by performing a heat treatment after a base is coated with the polyimide precursor composition according to the exemplary embodiment. The polyimide molded article prepared by using the polyimide precursor composition is not particularly limited.

As an example of the preparing method of the polyimide molded article according to the exemplary embodiment, a method of preparing an endless belt will be described below in detail.

For example, the preparing method of an endless belt includes a process of forming an coated film by applying the polyimide precursor composition onto a cylindrical base, a process of forming a dried film, by drying the coated film formed on the base, a process of forming a polyimide resin layer by performing imidization treatment (heat treatment) on the dried film and imidizing the polyimide precursor, and a process of detaching the polyimide resin layer from the base and setting the detached polyimide resin layer as the endless belt. A specific example is as follows.

First, an inner surface or an outer surface of the cylindrical base is coated with the polyimide precursor composition, and thereby a coated film is formed. As the cylindrical base, for example, a cylindrical metallic base is appropriately used. Instead of the metallic base, a base formed of other materials such as resin, glass, and ceramic maybe used. Glass coating, ceramic coating, and the like may be provided on the surface of the base. In addition, a silicone peeling agent, a fluorine peeling agent, and the like may be applied.

Here, a process of defoaming the polyimide precursor composition may be performed before coating, in order to apply the polyimide precursor composition with high accuracy. The polyimide precursor composition is defoamed and thus occurrence of foam and defects on the coated film during coating is prevented.

As a method of defoaming the polyimide precursor composition, a method of causing the polyimide precursor composition to be in a decompression state, a method of performing centrifugal separation and the like are included. However, the method of causing the polyimide precursor composition to be in a decompression state is appropriate because this method is simple and has large defoaming performance.

Then, the cylindrical base on which the coated film with the polyimide precursor composition is formed is placed under a heating or vacuum environment and the application film is dried, and thereby a dried film is formed. The solvent being equal to or greater than 30% by weight of the contained solvent and preferably equal to or greater than 50% by weight is volatilized.

Then, the imidization treatment (heat treatment) is performed on the dried film, and thereby a polyimide resin layer is formed.

Heating conditions of the imidization treatment are a temperature of 150° C. to 400° C. (preferably 200° C. to 300° C.) and a period of time of 20 minutes to 60 minutes, for example. Heating under the above heating conditions causes the imidization reaction, and thereby the polyimide resin layer is formed. Before the temperature reaches the final temperature in heating process, heating may be performed at the temperature which is increased stepwise or is slowly increased at a constant speed, during a heating reaction. The temperature during imidization varies, for example, depending on the types of tetracarboxylic dianhydride and diamine which are used as the raw material. If the imidization is insufficiently performed, mechanical characteristics and electrical characteristics are deteriorated. Thus, the temperature during imidization is set to be a temperature causing the imidization to be completed.

Then, the polyimide resin layer is detached from the cylindrical base and thereby an endless belt is obtained.

When the polyimide molded article is used as an intermediate belt, a value of surface resistivity of an outer circumferential surface is preferably from 8 (Log Ω/square) to 13 (Log Ω/square) in a manner of common logarithm, and is more preferably from 8 (Log Ω/square) to 12 (Log Ω/square). If the value of the surface resistivity in the common logarithm is greater than 13 (Log Ω/square), a recording medium and an intermediate transfer member may electrostatically adhere to each other during secondary transfer, and thus peeling of the recording medium may be different. If the value of the surface resistivity in the common logarithm is smaller than 8 (log Ω/square), holding power of a toner image which has been primarily transferred to the intermediate transfer member may be insufficient and thus image quality may be granulated or an image may be in disorder.

The value of the surface resistivity in common logarithm is controlled by the type of the conductive material and the quantity of the added conductive material.

Polyimide Molded Article

The polyimide molded article formed of the polyimide precursor composition according to the exemplary embodiment contains an aqueous solvent, an organic amine compound, and the like contained in the polyimide precursor composition according to the exemplary embodiment.

An aqueous solvent contained in the polyimide molded article is, for example, 1 ppb or more and less than 1% of the polyimide molded article. The quantity of the aqueous solvent contained in the polyimide molded article is determined in such a manner that the volume of a gas generated by heating the polyimide molded article is determined by using a gas chromatography method. The quantity of the organic amine compound contained in the polyimide molded article is also determined in such a manner that the volume of a gas generated by heating the polyimide molded article is determined by using a gas chromatography method.

The film thickness of the polyimide molded article varies depending on purposes. However, a lower limit of the film thickness is generally equal to or greater than 5 μm. If the film thickness of the polyimide molded article is equal to or greater than 30 μm (particularly, 50 μm), whitening on the back surface of the polyimide molded article or the crack occurs remarkably. An upper limit of the film thickness of the polyimide molded article is generally 300 μm.

If the film thickness of the polyimide molded article is set to be in a range of 5 μm to 300 μm, a molded article having good in-plane uniformity, good uniformity in film thickness, good uniformity in physical property in a film thickness direction, and the like is easily obtained.

EXAMPLES

Hereinafter, the exemplary embodiment of the invention will be described in reference to examples. However, the exemplary embodiment of the invention is not limited to these examples. In the following descriptions, all of "part" and "%" are by weight unless otherwise indicated.

Example 1

Preparation of Polyimide Precursor Composition (A-1)
Polymerization Method
A flask equipped with a stirring bar, a thermometer and a dripping funnel is filled with 182.57 g of water and 20.29 g of TMU. Here, 10.81 g (0.1 mol) of PDA (molecular weight: 108.14) and 21.82 g (0.2156 mol) of TEA (organic amine compound) are added and stirred at 20° C. for 10 minutes to perform dispersing. 28.83 g (0.098 mol) of BPDA (molecular weight: 294.22) is added to the resultant solution, and is stirred for 24 hours while maintaining the reaction temperature of 20° C. to perform dissolution and reaction. Thus, a polyimide precursor composition (A-1) is obtained.

Measurement is performed as follows.
Viscosity Measuring Method
Viscosity is measured under the following conditions by using an E type viscometer.
  Measuring device: E type rotation viscometer TV-20H (Toki Sangyo Co., Ltd)
  Measurement probe: No. 3 type rotor 3°×R14
  Measurement temperature: 22° C.
Solid Content Measuring Method
A solid content is measured under the following conditions by using a differential heat-thermogravimetry simultaneous measurement device. The solid content ratio is determined based on the solid content of the polyimide precursor and polyimide measured at 380° C.
  Measuring device: differential heat-thermogravimetry simultaneous measurement device TG/DTA6200 (Seiko Instruments Inc.)
  Measurement range: from 20° C. to 400° C.
  Temperature rising speed: 20° C./minute
Storage Stability of Composition
Viscosity Change Rate (%) in Room Temperature Storing (25° C.)
A viscosity change rate (%) in room temperature storing is calculated based on an initial viscosity of the polyimide precursor composition and viscosity after the polyimide precursor composition is stored at 25° C. for 60 days, by using the following expression. A smaller numerical value obtained by the calculation means the better storage stability in the room temperature storing.

|(viscosity after 60 days)−(initial viscosity)|/(initial viscosity)×100(%)

The above "| |" indicates an absolute value.

Whether or not Solidification is Caused in Cold Storing (−4° C.)
After the polyimide precursor composition is stored in a refrigerator (−4° C.) for 30 days, the state of the polyimide precursor composition is visually observed, and the results of the observation are evaluated based on the following criteria. A+ means the best characteristics.
  A+: with respect to the composition, none of turbidity, phase separation, and solidification is observed.
  A: the composition is a little turbid, but solidification is not observed.
  B: phase separation or solidification is observed at a portion of the composition.
  C: phase separation or solidification is observed at the half or more of the composition.
Formation or not of Surface Film
The polyimide precursor composition is defoamed under reduced pressure (0.02 MPa) for 12 hours and then, a surface on which the composition contacts with an outer air is observed. Results of observation are evaluated based on the following criteria, A+ means the best characteristics.
  A+: the surface film is not formed and bubbles do not remain in the solution.
  A: the surface film is not formed, but bubbles on a surface of the solution remain.
  B: the surface film is formed and bubbles in the vicinity of the surface of the solution are not removed completely.
  C: the surface film is formed and bubbles in the solution are not removed completely.
Preparation of Film
An outer surface of a stainless steel cylindrical mold (base) being 90 mm in outer diameter, and 450 mm in length is coated with a silicone release agent (manufactured by Shin-Etsu Chemical Co., Ltd., product name: KS-700), followed by dry treatment (release-agent treatment is performed).

While the cylindrical mold subjected to the release-agent treatment is rotated at a speed of 20 rpm in a circumferential direction, a polyimide precursor composition is discharged from a dispenser having a caliber of 1.0 mm at an end portion of the cylindrical mold, and coating with the discharged polyimide precursor composition is performed with uniform pressing on a metal blade installed on the mold. Specifically, the dispenser unit is moved at a speed of 60 mm/minute in an axial direction of the cylindrical mold, and thus the cylindrical mold is spirally coated with the coating liquid. After coating, the blade is disjoined, and then leveling is performed by continuously rotating the cylindrical mold for two minutes.

Then, the mold and the coated material are subjected to the dry treatment for 30 minutes with rotation at 10 rpm under an atmosphere of 120° C. air in a dry furnace. The solvent is volatilized from the coated material in the dry treatment, and thus a polyamic acid resin molded article (main member of an endless belt) of the polyimide precursor having self-supporting characteristics is obtained from the coated material.

Then, a baking treatment is performed at 350° C. in a clean oven for 30 minutes and thus the solvent is distilled and the imidization reaction is completed.

Then, the cylindrical mold is set to be at 25° C., and the resin is detached from the cylindrical mold, and thereby a cylindrical polyimide molded article is obtained.

Formation or not of Surface Film
In the film preparing process, the cylindrical mold is stored in environments of the room temperature (25° C.) and 30° C. after coating with the polyimide precursor composition is performed, before drying is performed. Results of the storing are evaluated based on the following criteria. A+ means the best characteristics.

A+: no surface film is formed.

A: the surface film is formed for a period of time from one hour to three hours.

B: the surface film is formed within 30 minutes.

C: the surface film is formed within 10 minutes.

Crack of Film

In the film preparing process, after the baking treatment is completed, when the resin is detached from the cylindrical mold, evaluation is performed based on the following criteria. A+ means the best characteristics.

A+: a crack is not observed and the crack does not occur even when the film is peeled off the base.

A: a crack is not observed, but the crack occurs at a portion of the resin when being peeled off the base.

B: a crack less than 1 cm is observed at a portion of the film.

C: a crack of 1 cm or more is observed at a portion of the film.

Whitening of Back Surface

In the film preparing process, the back surface (surface on which the polyimide precursor composition comes into contact with the mold (base)) of the cylindrical polyimide molded article after being detached from the cylindrical mold is evaluated based on the following criteria. A+ means the best characteristics.

A+: the turbid back surface or whitening on the back surface is not observed.

A: a turbid portion of the back surface is observed, but whitening is not observed.

B: whitening is observed at a portion of the back surface.

C: whitening is observed on the entirety of the back surface.

Measurement of Film Thickness

The film thickness of a polyimide molded article obtained through the film preparing process is measured by using a constant pressure thickness measuring instrument.

Tensile Strength and Extension

A sample piece is punched and molded from the prepared film by using a dumbbell No. 3. The sample piece is installed in a tensile tester. Then, application load (tensile strength) which cause the sample piece to be pulled and broken, and breaking elongation (tensile elongation) are measured under the following conditions. At this time, the tensile strength and extension are measured only in Example 47 and Comparative Examples 16 to 18 (which will be described later).

Test Device: tensile tester 1605 type (product manufactured by Aikoh Engineering Co., Ltd.)
Length of sample: 30 mm
Width of sample: 5 mm
Speed of pulling: 10 mm/min Examples 2 to 40, and Comparative Examples 1 to 10, Comparative Example 101, and Comparative Examples 11 to 13

Preparation of Polyimide Precursor Compositions (A-2) to (A-40), (C-1) to (C-10), (C-101), and (C-11) to (C-13)

Polyimide precursor compositions (A-2) to (A-40), (C-1) to (C-10), (C-101), and (C-11) to (C-13) are prepared by causing synthetic conditions of the polyimide precursor composition to be similar to Example 1 except for being changed to conditions described in Tables 1 to 4. Then, the prepared polyimide precursor compositions are evaluated similarly to in Example 1. Evaluation results are shown in Tables 1 to 4.

Synthetic Example 1

Preparation of Polyimide Precursor (PAA-1)

A flask equipped with a stirring bar, a thermometer and a dripping funnel is filled with 165.60 g of NMP. 20.02 g (0.1 mol) of ODA (molecular weight: 200.24) is added to this solution and stirred at 20° C. for 10 minutes so as to be dispersed. 21.38 g (0.098 mmol) of PHDA (molecular weight: 218.122) is added to this solution, and dissolution and a reaction is performed by performing stirring for 24 hours with being held at the reaction temperature of 20° C. Thus, a polymer is obtained.

Then, this solution is dropped in 5 L of acetone for 5 hours with stirring and thereby precipitating a solid of a polyimide precursor. The solid is extracted by filtration and vacuum dry is performed for 20 hours. Thus, a polyimide precursor (PAA-1) is obtained. The number average molecular weight of the obtained polyimide precursor (PAA-1) is 25,000 by GPC measurement.

Synthetic Example 2

Preparation of Polyimide Precursor (PAA-2)

A flask equipped with a stirring bar, a thermometer and a dripping funnel is filled with 195.43 g of DMF. 20.02 g (0.1 mol) of ODA (molecular weight: 200.24) is added to this solution and stirred at 20° C. for 10 minutes to perform dispersing. 28.83 g (0.098 mmol) of BPDA (molecular weight: 294.22) is added to the resultant solution, and is allowed to stand for 24 hours at the reaction temperature of 20° C. with stirring to perform dissolution and reaction. Thus, a polymer is obtained.

Then, this solution is dropped in 5 L of acetone for 5 hours with stirring and thereby precipitating a solid of a polyimide precursor. The solid is extracted by filtration and vacuum dry is performed for 20 hours. Thus, a polyimide precursor (PAA-2) is obtained. The number average molecular weight of the obtained polyimide precursor (PAA-2) is 30,000 by GPC measurement.

Regarding the polyimide precursors (PAA-1) and (PAA-2), the quantity of reduction of thermogravimetry is measured under the same condition as that of the above-described solid content measurement. As a result of the measurement, it is confirmed that, the quantity of a change of the weight except for dehydration occurring by imidization is within 5% by weight. That is, the solid content as the polyimide precursor is equal to or greater than 95% by weight.

Example 41

Preparation of Polyimide Precursor Composition (A-41)
Re-Sedimentation and Re-Dissolution Method 25.1 g of the polyimide precursor (PAA-1) is added to an aqueous medium which contains 29.62 g of water and 16.59 g of TMU, and 13.03 g of furfuryl alcohol, and 10.71 g of diethyl-2-hydroxylamine and 5.35 g of TEA are added. A result of the addition is heated to 40° C. with stirring so as to be dissolved. Thus, a polyimide precursor composition (A-41) is prepared. Then, the prepared polyimide precursor composition (A-41) is evaluated similarly to in Example 1, Evaluation results are shown in Table 5.

Examples 42 to 47 and Comparative Examples 14 to 15 and 17

Preparation of Polyimide Precursor Compositions (A-42) to (A-47), (C-14) to (C-15), and (C-17)

Re-Sedimentation and Re-Dissolution Method

Polyimide precursor compositions (A-42) to (A-47), (C-14) to (C-15) and (C-17) are prepared by causing synthetic conditions of the polyimide precursor composition to be similar to Example 41 except for being changed to conditions described in Tables 5 and 6. Then, the prepared polyimide precursor compositions are evaluated similarly to in Example 1. Evaluation results, are shown in Table 5 and 6.

Comparative Example 16

Preparation of Polyamide-Imide Precursor Composition (C-16)

37.24 g of polyamide-imide powder (Torlon AI-10 (below described as PAI-1), product manufactured by Solvay Co., Ltd.) is added to an aqueous medium which contains 81.31 g of water and 14.35 g of dimethylacetoacetamide are added. 22.26 g of TEA are further added. The polyamide-imide is hydrolyzed by heating a result of the addition to 60° C. for 6 hours with stirring so as to be dissolved in a form of an amine salt. Thus, a polyamide-imide precursor composition (C-16) is prepared. Then, the prepared polyamide-imide precursor composition (C-16) is evaluated similarly to in Example 1. Evaluation results are shown in Table 6.

Comparative Example 18

Preparation of Polyamide-Imide Precursor Composition (C-18)

A polyamide-imide precursor composition (C-18) is prepared by causing synthetic conditions of the polyimide precursor composition to be similar to Comparative Example 16 except for being changed to conditions described in Table 6. Then, the prepared polyimide precursor composition (C-18) is evaluated similarly to in Example 1. Evaluation results are shown in Table 6.

TABLE 1

| | | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|
| Polyimide precursor composition No. | | | C-1 | C-2 | C-3 | C-4 | C-5 | C-6 | C-7 | C-8 |
| Condition for preparing and result | Tetracarboxylic dianhydride | | BPDA | BPDA | BPDA | BPDA | BPDA | BPDA | BPDA | BPDA |
| | Diamine compound | | PDA | PDA | PDA | PDA | PDA | PDA | PDA | PDA |
| | Tetracarboxylic dianhydride/diamine compound Molar ratio | | 0.98 | 0.98 | 0.98 | 0.98 | 0.98 | 0.98 | 0.98 | 0.98 |
| | Organic amine compound | | TEA | TEA | TEA | TEA | TEA | TEA | TEA | TEA |
| | Organic amine addition quantity (mol %) | | 110 | 110 | 110 | 110 | 110 | 110 | 110 | 110 |
| | Organic solvent | Chemical type 1 | — | — | — | acetone | THF | DMF | DMAc | NMP |
| | | Ratio (%) in aqueous solvent | 0 | 0 | 0 | 10 | 10 | 10 | 10 | 10 |
| | | Chemical type 2 | — | — | — | — | — | — | — | — |
| | | Ratio (%) in aqueous solvent | 0 | 0 | 0 | 0 | 0 | 0 | 0 | 0 |
| | Water | Ratio (%) in aqueous solvent | 100 | 100 | 100 | 90 | 90 | 90 | 90 | 90 |
| | Solid content (wt %) of polyimide precursor | | 9 | 10 | 15 | 15 | 15 | 15 | 15 | 15 |
| | Solid content (wt %) of polyimide | | 8 | 9 | 14 | 14 | 14 | 14 | 14 | 14 |
| | Number average molecular weight (GPC) | | 15,000 | 15,000 | 15,000 | 20,000 | 20,000 | 20,000 | 20,000 | 20,000 |
| | Presence or not of terminal amino group | | Presence | Presence | Presence | Presence | Presence | Presence | Presence | Presence |
| Solution characteristics of composition | Storage stability of composition | Change of viscosity in room temperature storing (25° C.) | 153 | 167 | 186 | 187 | 164 | 152 | 143 | 146 |
| | | Presence or not of solidification in cold storing (−4° C.) | C | C | C | C | C | B | B | B |
| | Presence or not of formation of surface film | Room temperature (25° C.) | B | B | C | B | B | B | B | B |
| | | 30° C. | C | C | C | C | C | B | B | B |
| | | After defoaming under reduced pressure | C | C | C | C | C | B | B | B |
| Film preparing characteristics | | Film thickness (μm) | 28 | 32 | 50 | 52 | 56 | 56 | 54 | 50 |
| | | Whitening on back surface | B | C | C | C | C | B | B | B |
| | | Crack of film | B | B | C | B | B | B | B | B |

| | | | Example 1 | Example 2 | Example 3 | Example 4 | Example 5 | Example 6 | Example 7 |
|---|---|---|---|---|---|---|---|---|---|
| Polyimide precursor composition No. | | | A-1 | A-2 | A-3 | A-4 | A-5 | A-6 | A-7 |
| Condition for preparing and result | Tetracarboxylic dianhydride | | BPDA | BPDA | BPDA | BPDA | BPDA | BPDA | BPDA |
| | Diamine compound | | PDA | PDA | PDA | PDA | PDA | PDA | PDA |
| | Tetracarboxylic dianhydride/diamine compound Molar ratio | | 0.98 | 0.98 | 0.98 | 0.98 | 0.98 | 0.98 | 0.98 |

TABLE 1-continued

|  |  |  |  |  |  |  |  |  |  |
|---|---|---|---|---|---|---|---|---|---|
|  |  | Organic amine compound | TEA | TEA | TEA | TEA | TEA | TEA | TEA |
|  |  | Organic amine addition quantity (mol %) | 110 | 110 | 110 | 110 | 110 | 110 | 110 |
|  |  | Organic solvent — Chemical type 1 | TMU | TEU | DMPU | B-7 | C-3 | B-4 | DMI |
|  |  | Ratio (%) in aqueous solvent | 10 | 10 | 10 | 10 | 10 | 10 | 10 |
|  |  | Chemical type 2 | — | — | — | — | — | — | — |
|  |  | Ratio (%) in aqueous solvent | 0 | 0 | 0 | 0 | 0 | 0 | 0 |
|  |  | Water Ratio (%) in aqueous solvent | 90 | 90 | 90 | 90 | 90 | 90 | 90 |
|  |  | Solid content (wt %) of polyimide precursor | 15 | 15 | 15 | 15 | 15 | 15 | 15 |
|  |  | Solid content (wt %) of polyimide | 14 | 14 | 14 | 14 | 14 | 14 | 14 |
|  |  | Number average molecular weight (GPC) | 25,000 | 25,000 | 25,000 | 25,000 | 25,000 | 25,000 | 25,000 |
|  |  | Presence or not of terminal amino group | Presence | Presence | Presence | Presence | Presence | Presence | Presence |
| Solution characteristics of composition | Storage stability of composition | Change of viscosity in room temperature storing (25° C.) | 114 | 110 | 113 | 125 | 127 | 108 | 111 |
|  |  | Presence or not of solidification in cold storing (−4° C.) | A+ | A+ | A+ | A | A | A+ | A+ |
|  | Presence or not of formation of surface film | Room temperature (25° C.) | A+ | A+ | A+ | A | A | A+ | A+ |
|  |  | 30° C. | A | A | A | A | A | A | A |
|  |  | After defoaming under reduced pressure | A | A | A | A | A | A | A |
| Film preparing characteristics |  | Film thickness (μm) | 55 | 52 | 54 | 51 | 51 | 52 | 57 |
|  |  | Whitening on back surface | A | A | A | A | A | A | A |
|  |  | Crack of film | A+ | A+ | A+ | A | A | A+ | A+ |

TABLE 2

|  |  |  | Example 8 | Example 9 | Example 10 | Example 11 | Example 12 | Example 13 |
|---|---|---|---|---|---|---|---|---|
| Condition for preparing and result | Polyimide precursor composition No. |  | A-8 | A-9 | A-10 | A-11 | A-12 | A-13 |
|  | Tetracarboxylic dianhydride |  | BPDA | BPDA | BPDA | BPDA | BPDA | BPDA |
|  | Diamine compound |  | PDA | PDA | PDA | PDA | PDA | PDA |
|  | Tetracarboxylic dianhydride/diamine compound Molar ratio |  | 0.98 | 0.98 | 0.98 | 0.98 | 0.98 | 0.98 |
|  | Organic amine compound |  | TEA | TEA | TEA | TEA | TEA | TEA |
|  | Organic amine addition quantity (mol %) |  | 110 | 110 | 110 | 110 | 110 | 110 |
|  | Organic solvent | Chemical type 1 | DMI | DMI | DMI | DMI | DMI | DMI |
|  |  | Ratio (%) in aqueous solvent | 5 | 20 | 25 | 30 | 40 | 50 |
|  |  | Chemical type 2 | — | — | — | — | — | — |
|  |  | Ratio (%) in aqueous solvent | 0 | 0 | 0 | 0 | 0 | 0 |
|  | Water | Ratio (%) in aqueous solvent | 95 | 80 | 75 | 70 | 60 | 50 |
|  | Solid content (wt %) of polyimide precursor |  | 15 | 15 | 15 | 15 | 15 | 15 |
|  | Solid content (wt %) of polyimide |  | 14 | 14 | 14 | 14 | 14 | 14 |
|  | Number average molecular weight (GPC) |  | 25,000 | 25,000 | 25,000 | 25,000 | 25,000 | 25,000 |
|  | Presence or not of terminal amino group |  | Presence | Presence | Presence | Presence | Presence | Presence |
| Solution characteristics of composition | Storage stability of composition | Change of viscosity in room temperature storing (25° C.) | 114 | 109 | 105 | 106 | 112 | 115 |
|  |  | Presence or not of solidification in cold storing (−4° C.) | A+ | A+ | A+ | A+ | A+ | A+ |
|  | Presence or not of formation of surface film | Room temperature (25° C.) | A+ | A+ | A+ | A+ | A+ | A+ |
|  |  | 30° C. | A | A+ | A+ | A+ | A | A |
|  |  | After defoaming under reduced pressure | A | A+ | A+ | A+ | A | A |

TABLE 2-continued

| | | | | | | | |
|---|---|---|---|---|---|---|---|
| Film preparing characteristics | Film thickness (μm) | 53 | 50 | 58 | 55 | 56 | 51 |
| | Whitening on back surface | A | A+ | A+ | A+ | A | A |
| | Crack of film | A+ | A+ | A+ | A+ | A+ | A+ |

| | | | Comparative Example 9 | Comparative Example 10 | Example 14 | Example 15 | Comparative Example 101 |
|---|---|---|---|---|---|---|---|
| Polyimide precursor composition No. | | | C-9 | C-10 | A-14 | A-15 | C-101 |
| Condition for preparing and result | Tetracarboxylic dianhydride | | BPDA | BPDA | BPDA | BPDA | BPDA |
| | Diamine compound | | PDA | PDA | PDA | PDA | PDA |
| | Tetracarboxylic dianhydride/ diamine compound Molar ratio | | 0.99 | 0.99 | 0.99 | 0.99 | 0.98 |
| | Organic amine compound | | DMIz | EMIz | DMIz | EMIz | TEA |
| | Organic amine addition quantity (mol %) | | 125 | 125 | 125 | 125 | 110 |
| | Organic solvent | Chemical type 1 | — | — | DMI | DMI | DMI |
| | | Ratio (%) in aqueous solvent | 0 | 0 | 10 | 10 | 4 |
| | | Chemical type 2 | — | — | — | — | — |
| | | Ratio (%) in aqueous solvent | 0 | 0 | 0 | 0 | 0 |
| | Water | Ratio (%) in aqueous solvent | 100 | 100 | 90 | 90 | 96 |
| | Solid content (wt %) of polyimide precursor | | 15 | 15 | 15 | 15 | 15 |
| | Solid content (wt %) of polyimide | | 14 | 14 | 14 | 14 | 14 |
| | Number average molecular weight (GPC) | | 15,000 | 15,000 | 30,000 | 30,000 | 15,000 |
| | Presence or not of terminal amino group | | Presence | Presence | Presence | Presence | Presence |
| Solution characteristics of composition | Storage stability of composition | Change of viscosity in room temperature storing (25° C.) | 194 | 196 | 112 | 114 | 137 |
| | | Presence or not of solidification in cold storing (−4° C.) | C | C | A+ | A+ | B |
| | Presence or not of formation of surface film | Room temperature (25° C.) | C | C | A+ | A+ | B |
| | | 30° C. | C | C | A | A | B |
| | | After defoaming under reduced pressure | C | C | A | A | B |
| Film preparing characteristics | Film thickness (μm) | | 56 | 51 | 55 | 54 | 55 |
| | Whitening on back surface | | C | C | A | A | B |
| | Crack of film | | C | C | A+ | A+ | B |

TABLE 3

| | | | Example 16 | Example 17 | Example 18 | Example 19 | Example 20 | Example 21 | Example 22 |
|---|---|---|---|---|---|---|---|---|---|
| Polyimide precursor composition No. | | | A-16 | A-17 | A-18 | A-19 | A-20 | A-21 | A-22 |
| Condition for preparing and result | Tetracarboxylic dianhydride | | BPDA | BPDA | BPDA | BPDA | BPDA | BPDA | BPDA |
| | Diamine compound | | PDA | PDA | PDA | PDA | PDA | PDA | PDA |
| | Tetracarboxylic dianhydride/ diamine compound Molar ratio | | 0.99 | 0.99 | 0.99 | 0.99 | 0.99 | 0.99 | 0.99 |
| | Organic amine compound | | TEA | MMO | N-methyl piperidine | N-ethyl piperidine | N-methyl piperidine | morpholine | diethylamine |
| | Organic amine addition quantity (mol %) | | 120 | 120 | 120 | 120 | 120 | 120 | 120 |
| | Organic solvent | Chemical type 1 | DMI | DMI | DMI | DMI | DMI | DMI | DMI |
| | | Ratio (%) in aqueous solvent | 10 | 10 | 10 | 10 | 10 | 10 | 10 |
| | | Chemical type 2 | — | — | — | — | — | — | — |
| | | Ratio (%) in aqueous solvent | 0 | 0 | 0 | 0 | 0 | 0 | 0 |
| | Water | Ratio (%) in aqueous solvent | 90 | 90 | 90 | 90 | 90 | 90 | 90 |
| | Solid content (wt %) of polyimide precursor | | 15 | 15 | 15 | 15 | 15 | 15 | 15 |

TABLE 3-continued

|  |  |  |  |  |  |  |  |  |  |
|---|---|---|---|---|---|---|---|---|---|
|  |  | Solid content (wt %) of polyimide | 14 | 14 | 14 | 14 | 14 | 14 | 14 |
|  |  | Number average molecular weight (GPC) | 30,000 | 30,000 | 30,000 | 30,000 | 30,000 | 20,000 | 20,000 |
|  |  | Presence or not of terminal amino group | Presence | Presence | Presence | Presence | Presence | Presence | Presence |
| Solution characteristics of composition | Storage stability of composition | Change of viscosity in room temperature storing (25° C.) | 111 | 116 | 112 | 116 | 115 | 118 | 116 |
|  |  | Presence or not of solidification in cold storing (−4° C.) | A+ | A+ | A+ | A+ | A+ | A+ | A+ |
|  | Presence or not of formation of surface film | Room temperature (25° C.) | A+ | A+ | A+ | A+ | A+ | A+ | A+ |
|  |  | 30° C. | A | A | A | A | A | A | A |
|  |  | After defoaming under reduced pressure | A | A | A | A | A | A | A |
| Film preparing characteristics |  | Film thickness (μm) | 54 | 50 | 55 | 57 | 53 | 52 | 58 |
|  |  | Whitening on back surface | A | A | A | A | A | A | A |
|  |  | Crack of film | A+ | A+ | A+ | A+ | A+ | A+ | A+ |

|  |  |  | Comparative Example 11 | Comparative Example 12 | Example 23 | Example 24 | Comparative Example 13 | Example 25 |
|---|---|---|---|---|---|---|---|---|
|  | Polyimide precursor composition No. |  | C-11 | C-12 | A-23 | A-24 | C-13 | A-25 |
|  | Condition for preparing and result | Tetracarboxylic dianhydride | BPDA | BPDA | BPDA | BPDA | BPDA | BPDA |
|  |  | Diamine compound | PDA | PDA | PDA | PDA | PDA | PDA |
|  |  | Tetracarboxylic dianhydride/diamine compound Molar ratio | 0.98 | 0.98 | 0.98 | 0.98 | 0.98 | 0.98 |
|  |  | Organic amine compound | TEA | 1-methyl piperidine | TEA | 1-methyl piperidine | triethylene diamine | triethylene diamine |
|  |  | Organic amine addition quantity (mol %) | 125 | 125 | 125 | 125 | 175 | 175 |
|  |  | Organic solvent Chemical type 1 | — | — | DMI | DMPU | PG | TEU |
|  |  | Ratio (%) in aqueous solvent | 0 | 0 | 10 | 10 | 45 | 45 |
|  |  | Chemical type 2 | — | — | — | — | — | — |
|  |  | Ratio (%) in aqueous solvent | 0 | 0 | 0 | 0 | 0 | 0 |
|  |  | Water Ratio (%) in aqueous solvent | 100 | 100 | 90 | 90 | 55 | 55 |
|  |  | Solid content (wt %) of polyimide precursor | 15 | 15 | 15 | 15 | 15 | 15 |
|  |  | Solid content (wt %) of polyimide | 14 | 14 | 14 | 14 | 14 | 14 |
|  |  | Number average molecular weight (GPC) | 15,000 | 15,000 | 25,000 | 25,000 | 20,000 | 30,000 |
|  |  | Presence or not of terminal amino group | Presence | Presence | Presence | Presence | Presence | Presence |
| Solution characteristics of composition | Storage stability of composition | Change of viscosity in room temperature storing (25° C.) | 196 | 196 | 117 | 114 | 162 | 117 |
|  |  | Presence or not of solidification in cold storing (−4° C.) | C | C | A+ | A+ | C | A+ |
|  | Presence or not of formation of surface film | Room temperature (25° C.) | C | C | A+ | A+ | B | A+ |
|  |  | 30° C. | C | C | A | A | C | A |
|  |  | After defoaming under reduced pressure | C | C | A | A | C | A |
| Film preparing characteristics |  | Film thickness (μm) | 51 | 51 | 52 | 55 | 53 | 51 |
|  |  | Whitening on back surface | C | C | A | A | C | A |
|  |  | Crack of film | C | C | A+ | A+ | B | A+ |

TABLE 4

|  |  |  | Example 26 | Example 27 | Example 28 | Example 29 | Example 30 | Example 31 | Example 32 | Example 33 |
|---|---|---|---|---|---|---|---|---|---|---|
| Polyimide precursor composition No. |  |  | A-26 | A-27 | A-28 | A-29 | A-30 | A-31 | A-32 | A-33 |
| Condition for preparing and result | Tetracarboxylic dianhydride |  | BPDA | BPDA | BPDA | BPDA | BPDA | BPDA | BPDA | BPDA |
|  | Diamine compound |  | PDA | PDA | PDA | PDA | PDA | PDA | PDA | ODA |
|  | Tetracarboxylic dianhydride/ diamine compound Molar ratio |  | 0.98 | 0.98 | 0.98 | 0.98 | 0.98 | 0.98 | 0.98 | 0.91 |
|  | Organic amine compound |  | TEA | TEA | TEA | TEA | TEA | TEA | TEA | MMO |
|  | Organic amine addition quantity (mol %) |  | 90 | 100 | 110 | 120 | 150 | 180 | 200 | 120 |
|  | Organic solvent | Chemical type 1 | B-4 | B-4 | B-4 | B-4 | B-4 | B-4 | B-4 | DMI |
|  |  | Ratio (%) in aqueous solvent | 20 | 20 | 20 | 20 | 20 | 20 | 20 | 25 |
|  |  | Chemical type 2 | — | — | — | — | — | — | — | — |
|  |  | Ratio (%) in aqueous solvent | 0 | 0 | 0 | 0 | 0 | 0 | 0 | 0 |
|  | Water | Ratio (%) in aqueous solvent | 80 | 80 | 80 | 80 | 80 | 80 | 80 | 75 |
|  | Solid content (wt %) of polyimide precursor |  | 15 | 15 | 15 | 15 | 15 | 15 | 15 | 15 |
|  | Solid content (wt %) of polyimide |  | 14 | 14 | 14 | 14 | 14 | 14 | 14 | 14 |
|  | Number average molecular weight (GPC) |  | 25,000 | 25,000 | 25,000 | 25,000 | 20,000 | 20,000 | 20,000 | 5,000 |
|  | Presence or not of terminal amino group |  | Presence | Presence | Presence | Presence | Presence | Presence | Presence | Presence |
| Solution characteristics of composition | Storage stability of composition | Change of viscosity in room temperature storing (25° C.) | 113 | 116 | 107 | 105 | 105 | 106 | 112 | 117 |
|  |  | Presence or not of solidification in cold storing (−4° C.) | A+ | A+ | A+ | A+ | A+ | A+ | A+ | A+ |
|  | Presence or not of formation of surface film | Room temperature (25° C.) | A+ | A+ | A+ | A+ | A+ | A+ | A+ | A+ |
|  |  | 30° C. | A | A | A+ | A+ | A+ | A+ | A | A |
|  |  | After defoaming under reduced pressure | A | A | A+ | A+ | A+ | A+ | A | A |
| Film preparing characteristics |  | Film thickness (μm) | 58 | 58 | 52 | 56 | 55 | 51 | 57 | 52 |
|  |  | Whitening on back surface | A | A | A+ | A+ | A+ | A+ | A | A |
|  |  | Crack of film | A+ | A+ | A+ | A+ | A+ | A+ | A+ | A+ |

|  |  |  | Example 34 | Example 35 | Example 36 | Example 37 | Example 38 | Example 39 | Example 40 |
|---|---|---|---|---|---|---|---|---|---|
| Polyimide precursor composition No. |  |  | A-34 | A-35 | A-36 | A-37 | A-38 | A-39 | A-40 |
| Condition for preparing and result | Tetracarboxylic dianhydride |  | BPDA | BPDA | BPDA | BPDA | BPDA | BPDA | BPDA |
|  | Diamine compound |  | ODA | ODA | ODA | ODA | ODA | PDA | PDA |
|  | Tetracarboxylic dianhydride/ diamine compound Molar ratio |  | 0.92 | 0.93 | 0.965 | 0.99 | 1.01 | 0.99 | 0.99 |
|  | Organic amine compound |  | MMO | MMO | MMO | MMO | MMO | MMO | MMO |
|  | Organic amine addition quantity (mol %) |  | 120 | 120 | 120 | 120 | 120 | 120 | 120 |
|  | Organic solvent | Chemical type 1 | DMI | DMI | DMI | DMI | DMI | DMI | DMI |
|  |  | Ratio (%) in aqueous solvent | 25 | 25 | 25 | 25 | 25 | 10 | 10 |
|  |  | Chemical type 2 | — | — | — | — | — | — | — |
|  |  | Ratio (%) in aqueous solvent | 0 | 0 | 0 | 0 | 0 | 0 | 0 |
|  | Water | Ratio (%) in aqueous solvent | 75 | 75 | 75 | 75 | 75 | 90 | 90 |
|  | Solid content (wt %) of polyimide precursor |  | 15 | 15 | 15 | 15 | 15 | 9 | 8 |
|  | Solid content (wt %) of polyimide |  | 14 | 14 | 14 | 14 | 14 | 8 | 7 |
|  | Number average molecular weight (GPC) |  | 7,000 | 10,000 | 25,000 | 30,000 | 30,000 | 30,000 | 30,000 |
|  | Presence or not of terminal amino group |  | Presence | Presence | Presence | Presence | None | Presence | Presence |
| Solution characteristics of composition | Storage stability of composition | Change of viscosity in room temperature storing (25° C.) | 116 | 104 | 105 | 106 | 119 | 106 | 106 |
|  |  | Presence or not of solidification in cold storing (−4° C.) | A+ | A+ | A+ | A+ | A+ | A+ | A+ |

TABLE 4-continued

|  |  |  |  |  |  |  |  |  |  |
|---|---|---|---|---|---|---|---|---|---|
|  | Presence or not of formation of surface film | Room temperature (25° C.) | A+ | A+ | A+ | A+ | A+ | A+ | A+ |
|  |  | 30° C. | A | A+ | A+ | A+ | A | A+ | A+ |
|  |  | After defoaming under reduced pressure | A | A+ | A+ | A+ | A | A+ | A+ |
| Film preparing characteristics | | Film thickness (μm) | 56 | 50 | 53 | 51 | 56 | 40 | 30 |
|  |  | Whitening on back surface | A | A+ | A+ | A+ | A | A+ | A+ |
|  |  | Crack of film | A+ | A+ | A+ | A+ | A | A+ | A+ |

TABLE 5

|  |  |  | Comparative Example 14 | Example 41 | Comparative Example 15 | Example 42 | Example 43 | Example 44 | Example 45 | Example 46 |
|---|---|---|---|---|---|---|---|---|---|---|
| Polyimide precursor composite No. | | | C-14 | A-41 | C-15 | A-42 | A-43 | A-44 | A-45 | A-46 |
| Condition for preparing and result | Resin | | PAA-1 | PAA-1 | PAA-2 | PAA-2 | PAA-2 | PAA-2 | PAA-2 | PAA-2 |
|  | Organic amine compound | | DEHEA/TEA (molar ratio 63/37) | DEHEA/TEA (molar ratio 63/37) | DEAB | DEAB | TEA | TEA | TEA | TEA |
|  | the number of moles of the organic amine compound/(the number of moles of tetracarboxylic dianhydride × 2) × 100 | | 120 | 120 | 110 | 110 | 110 | 110 | 110 | 110 |
|  | Organic solvent | Chemical type 1 | NMP | TMU | DMF | TMU | DMPU | C-3 | B-4 | DMI |
|  |  | Ratio (%) in aqueous solvent | 28 | 28 | 10 | 10 | 10 | 10 | 10 | 10 |
|  |  | Chemical type 2 | furfuryl alcohol | furfuryl alcohol | — | — | — | — | — | — |
|  |  | Ratio (%) in aqueous solvent | 22 | 22 | 0 | 0 | 0 | 0 | 0 | 0 |
|  | Water | Ratio (%) in aqueous solvent | 50 | 50 | 90 | 90 | 90 | 90 | 90 | 90 |
|  | Solid content (wt %) of polyimide precursor | | 25 | 25 | 25 | 25 | 25 | 25 | 25 | 25 |
|  | Solid content (wt %) of polyimide | | 23 | 23 | 23 | 23 | 23 | 23 | 23 | 23 |
| Solution characteristics of composition | Storage stability of composition | Change of viscosity in room temperature storing (25° C.) | 145 | 114 | 165 | 114 | 112 | 116 | 112 | 111 |
|  |  | Presence or not of solidification in cold storing (−4° C.) | B | A | C | A | A | A | A | A |
|  | Presence or not of formation of surface film | Room temperature (25° C.) | B | A | B | A | A | A | A | A |
|  |  | 30° C. | B | A | C | A | A | A | A | A |
|  |  | After defoaming under reduced pressure | B | A | C | A | A | A | A | A |
| Film preparing characteristics | | Film thickness (μm) | 52 | 55 | 53 | 55 | 55 | 51 | 54 | 55 |
|  |  | Whitening on back surface | B | A | C | A | A | A | A | A |
|  |  | Crack of film | B | A | B | A | A | A | A | A |

TABLE 6

|  |  |  | Comparative Example 16 | Comparative Example 17 | Comparative Example 18 | Example 47 |
|---|---|---|---|---|---|---|
| Polyimide precursor composition No. | | | C-16 | C-17 | C-18 | A-47 |
| Condition for preparing and result | Resin | | PAI-1 | PAA-2 | PAI-1 | PAA-2 |
|  | Organic amine compound | | TEA | TEA | TEA | TEA |
|  | the number of moles of the organic amine compound/(the number of moles of tetracarboxylic dianhydride × 2) × 100 | | 110 | 110 | 110 | 110 |
|  | Organic solvent | Chemical type 1 | DMAA | DMAA | DMI | DMI |
|  |  | Ratio (%) in aqueous solvent | 15 | 15 | 15 | 15 |
|  |  | Chemical type 2 | — | — | — | — |
|  |  | Ratio (%) in aqueous solvent | 0 | 0 | 0 | 0 |
|  | Water | Ratio (%) in aqueous solvent | 85 | 85 | 85 | 85 |
|  | Solid content (wt %) of polyimide precursor | | 24 | 25 | 24 | 25 |
|  | Solid content (wt %) of polyimide | | 23 | 23 | 23 | 23 |
| Solution characteristics of composition | Storage stability of composition | Change of viscosity in room temperature storing (25° C.) | 107 | 147 | 105 | 109 |
|  |  | Presence or not of solidification in cold storing (−4° C.) | A | B | A | A+ |

TABLE 6-continued

|   |   | Comparative Example 16 | Comparative Example 17 | Comparative Example 18 | Example 47 |
|---|---|---|---|---|---|
| Presence or not of formation of surface film | Room temperature (25° C.) | A | B | A | A+ |
|  | 30° C. | A | B | A | A+ |
|  | After defoaming under reduced pressure | A | B | A | A+ |
| Film preparing characteristics | Flim thickness (μm) | 50 | 56 | 53 | 50 |
|  | Whitening on back surface | A+ | B | A+ | A+ |
|  | Crack of film | A | B | A | A+ |
| Mechanical characteristics | Breaking strength (MPa) | 170 | 220 | 180 | 290 |
|  | Breaking elongation (%) | 10 | 25 | 12 | 40 |

From the results, it is found that the occurrence of whitening on the back surface after a film is prepared (whitening on the back surface of the polyimide molded article) is prevented in the examples, in comparison to in the comparative examples. In addition, it is found that good results therefor are obtained regarding storage stability in the room temperature storing and the cold storing, prevention of formation of the surface film when the composition is handled and when a film is prepared, and the occurrence of a crack after a film is prepared, in the examples.

From comparison of Example 47 to Comparative Examples 16 to 18 (comparison of the polyimide precursor composition to the polyamide-imide precursor composition), it is found that the mechanical characteristics, liquid characteristics of the composition, and film preparing characteristics are satisfied only in the examples.

Here, details of abbreviations used, in the examples are as follows.

Diamine
PDA: p-phenylenediamine
ODA: 4,4'-diaminodiphenyl ether
Tetracarboxylic Dianhydride
BPDA: 3,3',4,4'-biphenyl ether tetracarboxylic dianhydride
PMDA: pyromellitic dianhydride
Organic Amine
TEA: triethylamine
DMIz: 1,2-dimethyl imidazole
EMIz: 2-ethyl-4-methylimidazole
MMO: N-methylmorpholine
DEHEA: diethyl-2-hydroxyethylamine
DEAB: 1-diethylamino-3-butanone
Organic Solvent: Solvent Group A
TMU: tetramethyl urea
TEU: tetraethyl urea
DMPU: N,N'-dimethylpropylene urea
DMI: 1,3-dimethyl-2-imidazolidinone
B-4: exemplary compound B-4 (3-methoxy-N,N-dimethyl propanamide)
B-7: exemplary compound B-7 (3-n-butoxy-N,N-dimethyl propanamide)
C-3: exemplary compound C-3 (methyl 5-dimethyl amino-2-methyl-5-oxo-pentanate)
Organic Solvent: Others
DMF: N,N-dimethylformamide
DHAc: N-dimethylacetamide
NMP: N-methyl pyrrolidone
DMAA: dimethylacetoacetamide The "organic amine addition quantity (mol %)" in the examples corresponds to the quantity (mol %) of the amine compound with respect to an ideal quantity of the carboxyl group contained in the polyimide precursor. Here, the ideal quantity of the carboxyl group represents a value which is twice molar quantity of tetracarboxylic dianhydride contained in the polyimide precursor. That is, the organic amine addition quantity (mol %) is calculated by using the following expression.

Organic amine addition quantity (mol %)=the number of moles of the organic amine compound/(the number of moles of tetracarboxylic dianhydride×2)×100

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. A polyimide precursor composition, comprising:
a resin having a repeating unit represented by the following formula (I):

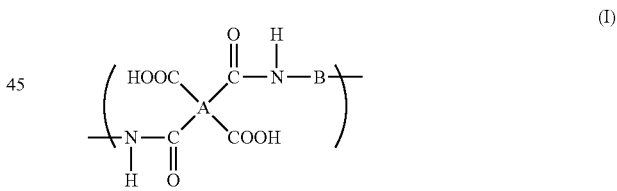

wherein A indicates a tetravalent organic group, and B indicates a bivalent organic group;
an organic amine compound that is at least one compound selected from the group consisting of pyrimidines, pyrazines, piperazines, triazines, morpholines, 1,4-diazabicyclo[2.2.2]octane, polyaniline, and polypyridine; and
an aqueous solvent containing 50% by weight or more of water and 5% by weight or more of an organic solvent, the organic solvent is at least one selected from the group consisting of a urea solvent, an amide solvent containing an alkoxy group, and an amide solvent containing an ester group.

2. The polyimide precursor composition according to claim 1, wherein a ratio of a total amount of the organic solvent is from 10% by weight to 40% by weight with respect to the aqueous solvent.

3. The polyimide precursor composition according to claim 1, wherein a ratio of a total amount of the organic solvent is from 15% by weight to 35% by weight with respect to the aqueous solvent.

4. The polyimide precursor composition according to claim 1, wherein a boiling point of the organic solvent is from 100° C. to 350° C.

5. The polyimide precursor composition according to claim 1, wherein a boiling point of the organic solvent is equal to or lower than 250° C.

6. The polyimide precursor composition according to claim 1, wherein the organic solvent is at least one selected from the group consisting of tetramethylurea, tetraethylurea, 1,3-dimethyl-2-imidazolidinone, N,N-dimethyl propylene urea, and 3-methoxy-N,N-dimethyl-propanamide.

7. The polyimide precursor composition according to claim 1, wherein the organic amine compound is a tertiary amine compound.

8. A method of preparing the polyimide precursor composition according to claim 1, comprising:
preparing the resin by polymerizing a tetracarboxylic dianhydride and a diamine compound in the presence of the organic amine compound in the aqueous solvent.

9. The method of preparing a polyimide precursor composition according to claim 8, wherein a ratio of a total amount of the organic solvent is from 10% by weight to 40% by weight with respect to the aqueous solvent.

10. The method of preparing a polyimide precursor composition according to claim 8, wherein a ratio of a total amount of the organic solvent is from 15% by weight to 35% by weight with respect to the aqueous solvent.

11. The method of preparing a polyimide precursor composition according to claim 8, wherein a boiling point of the organic solvent is from 100° C. to 350° C.

12. The method of preparing a polyimide precursor composition according to claim 8, wherein a boiling point of the organic solvent is equal to or lower than 250° C.

13. The method of preparing a polyimide precursor composition according to claim 8, wherein the organic solvent is at least one selected from the group consisting of tetramethylurea, tetraethylurea, 1,3-dimethyl-2-imidazolidinone, N,N-dimethyl propylene urea, and 3-methoxy-N,N-dimethyl-propanamide.

14. The method of preparing a polyimide precursor composition according to claim 8, wherein the organic amine compound is a tertiary amine compound.

15. A method of preparing a polyimide molded article, which comprises:
coating a base with the polyimide precursor composition according to claim 1, and performing a heat treatment to thereby obtain a polyimide molded article.

16. The method of preparing a polyimide molded article according to claim 15, which comprises:
preparing a polyimide molded article having a layer shape and a film thickness of 30 μm or more.

17. The method of preparing a polyimide molded article according to claim 15, which comprises:
preparing a polyimide molded article having a layer shape and a film thickness of 50 μm or more.

18. The polyimide precursor composition according to claim 1, wherein the organic solvent is at least one selected from the group consisting of an amide solvent containing an alkoxy group and an amide solvent containing an ester group.

19. The polyimide precursor composition according to claim 1, wherein a ratio of a total amount of the organic solvent is from 5% by weight to 15% by weight with respect to the aqueous solvent.

20. The polyimide precursor composition according to claim 1, wherein the organic amine compound further comprises at least one compound selected from the group consisting of 2-dimethylaminoethanol, 2-diethylaminoethanol and 2-dimethylaminopropanol.

* * * * *